(12) United States Patent
Lu et al.

(10) Patent No.: US 7,509,487 B2
(45) Date of Patent: Mar. 24, 2009

(54) SECURE NETWORKING USING A RESOURCE-CONSTRAINED DEVICE

(75) Inventors: HongQian Karen Lu, Austin, TX (US); Michael Andrew Montgomery, Austin, TX (US); Asad Mahboob Ali, Austin, TX (US)

(73) Assignee: Gemalto Inc., Austin, TX (US)

( * ) Notice: Subject to any disclaimer, the term of this patent is extended or adjusted under 35 U.S.C. 154(b) by 737 days.

(21) Appl. No.: 10/848,738

(22) Filed: May 19, 2004

(65) Prior Publication Data

US 2005/0108571 A1    May 19, 2005

Related U.S. Application Data

(60) Provisional application No. 60/506,992, filed on Sep. 29, 2003.

(51) Int. Cl.
    *G06F 21/00* (2006.01)
(52) U.S. Cl. ...................................................... 713/151
(58) Field of Classification Search .................. 713/151
    See application file for complete search history.

(56) References Cited

U.S. PATENT DOCUMENTS 6,480,935 B1 * 11/2002 Carper et al. ............... 711/115
2001/0051049 A1 * 12/2001 Horiguchi .................. 396/535
2003/0086542 A1 * 5/2003 Urien ....................... 379/93.01

FOREIGN PATENT DOCUMENTS

CA         2307020 A1    2/2000

OTHER PUBLICATIONS

Christophe Chausset et al, Serial PC/SC Smart Card Reader Application with TDA8029, Jul. 23, 2001, Phillips, pp. 1-41.*
Smart Cards as 1st-Class Network . . . , Nov. 12, 2002, Muller, whole.
Internet card, a smart card as a true . . . , Nov. 1, 2000, Urien, whole.
EAP-Support in Smart Card, Jun. 2003, Urien, et al, para 008-9.2, 014-14.3.
IP & ARP over ISO 7816, Jan. 2001, Guthery, et al, whole.

* cited by examiner

*Primary Examiner*—Gilberto Barron, Jr.
*Assistant Examiner*—Cordelia Kane
(74) *Attorney, Agent, or Firm*—Pehr Jansson; The Jansson Firm

(57) ABSTRACT

Secure communication between a resource-constrained device and remote network nodes over a network with the resource-constrained acting as a network node. The remote network nodes communicate with the resource-constrained device using un-modified network clients and servers. Executing on the resource-constrained device, a communications module implements one or more link layer communication protocols, operable to communicate with a host computer, operable to communicate with remote network nodes and operable to implement network security protocols thereby setting a security boundary inside the resource-constrained device.

68 Claims, 21 Drawing Sheets

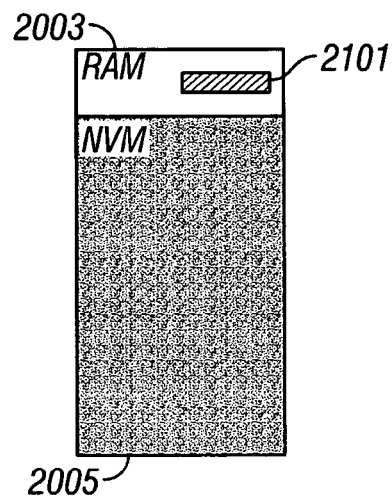 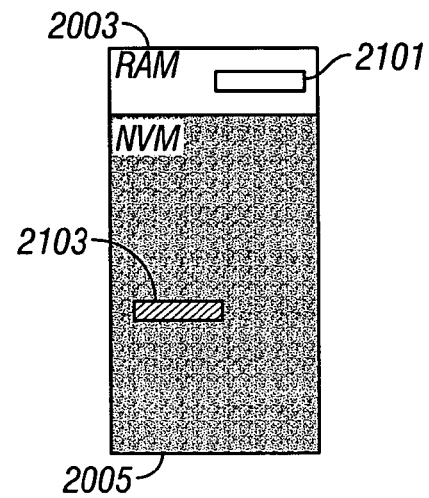
FIG. 21(a)   FIG. 21(b)
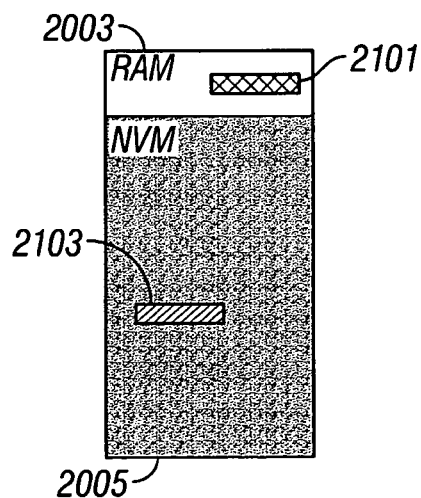 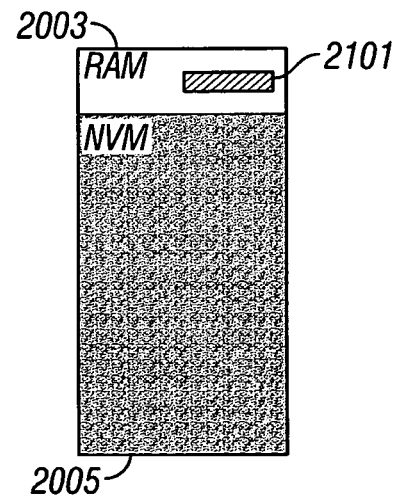
FIG. 21(c)   FIG. 21(d)

SECURE NETWORKING USING A RESOURCE-CONSTRAINED DEVICE

CROSS-REFERENCE TO RELATED APPLICATIONS

This invention claims priority pursuant to 35 U.S.C. 119 of U.S. Provisional Patent Application Ser. No. 60/506,992, filed on Sep. 29, 2003. This Provisional Application is hereby incorporated by reference in its entirety.

TECHNICAL FIELD

This invention relates in general to the field of communication between nodes on a computer network, and specifically to communicating in a secure manner between a remote node and a resource-constrained device.

BACKGROUND OF THE INVENTION

In the new information age, computing is becoming pervasive. Classes of machines that hitherto were entirely "dumb" machines are acquiring some level of "intelligence". As that trend continues, there are also higher levels of expectation placed on the machines. For example, where previous generations of machines were not expected to have any computing capability, subsequent generations have some degree of computerization. A further step in this evolution is connecting machines to networks. However, often either because of physical size constraints or because computing power and data storage are not the main function of a machine, the computational power and memory size may be very limited. These constraints have a great impact on the ability of such resource-constrained devices to interact with other nodes on a network.

An example of such a resource-constrained device is the smart card. A smart card is simply a plastic card containing an integrated circuit with some memory and a microprocessor. Typically the memory is restricted to 6K bytes of RAM. It is anticipated that smart card RAM may increase by a few kilobytes over the next few years. However, it is very likely that memory size will continue to be an obstacle to smart card applications. Most smart cards have 8-bit microprocessors.

Communications infrastructure presents another resource constraint on smart cards and similar devices. Smart cards do not have full speed USB communications, and lack full duplex serial interfaces. Currently smart cards use the ISO-7816 interface which operates at half duplex.

There are other devices with similar resource limitations. These include USB dongles (such as the iKey device sold by SafeNet, Inc., Belcamp, Md.), or SD Cards, or secure integrated circuit chips soldered directly to PC motherboards.

Herein, devices that have in common similar resource limitations, e.g., RAM limited to less than 64K, shall be referred to as "resource-constrained devices". Resource-constrained devices include smart cards, USB dongles, SD cards and secure integrated circuit chips attached directly to PC motherboards. Furthermore, the term resource-constrained device shall include any other devices that have similar resource constraints to these enumerated devices. For the sake of lucidity, the invention is described herein primarily in the context of smart cards. This must not be construed to limit the scope or applicability of the invention as it is equally applicable to other resource-constrained devices.

Smart cards have been used in many different applications in which data security is important. These include secure transactions, electronic purses, loyalty programs, encryption, computer access, building access, storage of personal medical data, and subscriber identity modules (SIM) for GSM mobile telephones. Hitherto, smart cards have been connected to host computers in order to perform their assigned tasks and smart cards have been primarily used in conjunction with off-line transactions.

Smart cards have been used with a terminal or a host, which may be a computer having a smart card reader, or a cell phone, or other devices. When smart cards are connected to computers, host applications cannot communicate with them using standard mainstream network interfaces. Specific hardware and software in the form of smart card reader device drivers and middle-ware applications are needed to access the card services.

The ISO 7816 specification is the standard for smart cards. Among other things, the standard specifies how the smart cards and the terminal communicate with each other. The communication is master/slave or command/response mode, where the terminal is the master and the card is the slave. When the card receives a command from the terminal, the card performs the requested operation and sends to the terminal a response relative to the command. The terminal may then send another command. The card cannot initiate the conversion. Recent works, for example U.S. Pat. No. 6,157,966 (Montgomery, M., Guthery, S., and du Castel, B. "System and Method for an ISO 7816 Compliant Smart Card to Become Master Over a Terminal") and the Proactive SIM used in GSM Phase II products, enable the card to initiate communication by having the terminal polling the card. Polling enables the card to request services from the terminal. The terminal examines the request (command from the card), and performs the service or accesses the Internet resource as required. In both cases (the terminal sends command or the smart card sends command), the smart card works with a terminal and is not a standalone device. A problem of this terminal dependent working model is the security. The terminal examines and interprets the messages coming from the network and from the smart card. The security boundary is on the terminal and not in the smart card. If the terminal is compromised, so is the card.

In the new information age, connecting to the Internet and conducting transactions of various sorts over the Internet is of paramount importance. It is therefore desirable to enable the use of smart cards and other resource-constrained devices to be connected to the Internet. There are several prior art examples of connecting smart cards and other resource-constrained devices to the Internet. These prior art examples fall into two categories: those that rely on a proxy on a computer connected to the Internet and those that implement a minimized communications protocol stack. FIG. 1 is a schematic illustration of one prior art mechanism for connecting a smart card 101 to a remote computer 103 via a network 105, e.g., the Internet. The smart card 101 is inserted into a smart card reader 107 either through physical electrical connectors or through some wireless connection mechanism. The reader 107 is connected (usually through a serial cable) to a host PC 109.

In the aforementioned scheme of using a smart card over the Internet, to establish secure communication with the remote computer requires the involvement of the host PC 109. Host applications take care of communicating with the smart card using the ISO 7816 standard, sending commands and then reading responses in APDU format. There is no communication security built into this format. As such the network security boundary resides on the host computer, and not on the smart card. A remote computer can connect to the host in a secure way, but the network link between host computer and smart card is generally not secure. GlobalPlatform (www.globalplatform.org—a consortium established to develop and promote smart card standards) has defined a way of encrypting APDUs between smart card and the host computer, but this approach also requires trusting the host computer. TCP/IP packets are decrypted on the host and then encrypted again for transmission to the smart card via APDU.

Some examples of Internet smart cards include Webcard, iSimplify!, and WebSim. The Webcard, developed by the Center for Information Technology Integration (CITI) of the University of Michigan in 1999 (Rees, J., and Honeyman, P., "Webcard: a Java Card Web Server," University of Michigan, CITI Technical Report 99-3, http://www.citi.umich.edu/projects/smartcard/webcard/citi-tr-99-3.html), executes as a Java Card applet. The Webcard deals with the resource constraints of a smart card by implementing a very simplified TCP/IP, which is just enough to support a simple HTTP server. The Webcard uses the standard ISO 7816 for communication with the host by transmitting IP packets using ISO 7816 APDUs. The host is configured to run a tunnel deamon, which is configured to receive all packets carrying a pre-specified IP address. The daemon forwards the IP packets with the proper address to the card.

A second class of resource-constrained devices that may be connected to the Internet consists of embedded TCP/IP implementations.

Secure Sockets Layer (SSL) and its successor Transport Layer Security (TLS) are the de facto standards for securing communication between web servers and web browsers. SSL and TLS protocols have been implemented on a vast variety of platforms that range from enterprise class servers to small hand-held devices. However, SSL and TLS have never been deployed on a device as small as a smart card.

SSL-C Micro Edition toolkit is a C based implementation of SSL/TLS protocols targeted at small devices with limited resources. It comes as part of RSA Security's BSAFE product line (RSA Security, SSL-C Micro Edition, http://www/rsasecurity.com/products/?g=5&id=6). SSL-C ME is targeted for platforms such as Windows CE, Palm, etc. However, its memory footprint and architecture cannot be extended for use in smart cards. For example, it automatically expands the size of read/write buffers to accommodate the size of TLS records, using as much as 32K RAM for the buffers alone. (RSA BSAFE, SSL-C Micro Edition Developer's Guide, version 1.1.0, by RSA Security. A PDF version of this document is available at: http://developer.rsasecurity.com/products/?g=5&id=6). Such memory usage would not work for resource-constrained devices such as smart cards.

Wedgetail Communications of Brisbane, Australia has a Java based product called JCSI Micro Edition SSL for CLDC/MIDP. It implements SSL 3.0 and TLS 1.0 protocols and adds HTTPS support to CLDC via standard CLDC connection interface. CLDC is the foundation for Java runtime environment targeted at small resource constrained devices such as mobile phones, pagers, and PDAs, but currently it is not targeted at devices as small as smart card. The CLDC 1.1 specification assumes at least 32K of volatile memory for VM runtime alone, with RAM still need for SSL context and I/O buffers. Therefore, this Wedgetail Communication product cannot be adapted for use in smart cards. Information about their JCSI Micro Edition SSL toolkit can be found at their website: http://www.wedgetail.com/jcsi/microedition/ssl/midp/index.html.

SSL Plus Embedded is an SSL toolkit for developing secure network solutions based on SSL 2.0, SSL 3.0 and TLS 1.0 protocols. It was developed by Certicom Corporation of Mississauga, Ontario, Canada. The target platforms include Palm, Windows CE, and VxWorks. The static library for SSL Plus Embedded requires about 70K. Although acceptable for other embedded devices the RAM requirement is too big for smart cards. Information about this toolkit can be found at Certicom's website at: http://www.certicom.com/products/ssl_plus/ssl_plus_embedded.html DeviceSSL is an SSL protocol implementation with optional support for TLS protocol. Developed by SPYRUS Inc. of San Jose, Calif., DeviceSSL serves as a toolkit for building secure network solutions for small connected devices. It is targeted for devices like PDA and RTOS applications on the network, but not for smart cards. The code footprint for DeviceSSL is about 100K on server side. The RAM requirement is unsuitable for a smart card. Information about this product is available at: http://www.spyrus.com/content/products/Terisa/DeviceSSL.asp.

From the foregoing, it is apparent that there is still a need for having resource-constrained devices, such as smart cards, that are able to communicate with other nodes on a network using standard protocols and network software applications. There is a further unmet need for having the security boundary located on the resource-constrained device so as to remove the host computer as a source of smart card vulnerability to attack.

Accordingly, there is a need for a resource-constrained device which implements a communications protocol stack that provides the resource-constrained device with the capability to act as a network node capable of secure communication using standard protocols.

SUMMARY OF THE INVENTION

In a preferred embodiment, the invention provides an infrastructureless resource-constrained device, for example, a smart card, capable of acting as a full-fledged network node providing secure communication to other nodes on the network and in which the security boundary is located on the infrastructureless resource-constrained device. Such infrastructureless resource-constrained devices can easily be adapted so that the resource-constrained device can provide many of the functions traditionally associated with full-fledged network nodes.

In a preferred embodiment of the invention, secure communication is provided for between a resource-constrained device and remote network nodes over a network. The remote network nodes communicate with the resource-constrained device using un-modified network clients and servers. The resource-constrained device has a central processing unit, a random access memory, non-volatile memory, a read-only memory, and an input and output component.

The communication between the resource-constrained device and the remote network nodes is established over one of several different types of physical links, e.g., USB, serial with full-duplex, serial with half-duplex, or contactless radio connection.

Executing on the resource-constrained device, a communications module implements one or more link layer communication protocols, operable to communicate with a host computer, operable to communicate with remote network nodes and operable to implement network security protocols thereby setting a security boundary inside the resource-constrained device. In one embodiment of the invention, the resource-constrained device implements an execution model, wherein the resource-constrained device uses at least one optimization technique selected from swapping data from the random access memory to the non-volatile memory, swapping data from the non-volatile memory to the random access memory; sharing data buffers between one or more communications protocol layers or security protocol layers, executing on the host computer one or more link layer communication protocols operable to communicate with the resource-constrained device and operable to communicate with the remote network nodes, and executing one or more secure network applications on the resource-constrained device wherein the network applications call upon the communication module of the resource-constrained device to communicate with the remote network node wherein the secure network applications are securely accessible by the remote network nodes using un-modified network clients and servers.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 21 is an illustration of swapping a data block from the RAM pool to NVM.

DETAILED DESCRIPTION OF THE PREFERRED EMBODIMENTS

1. Introduction

Figure 1:
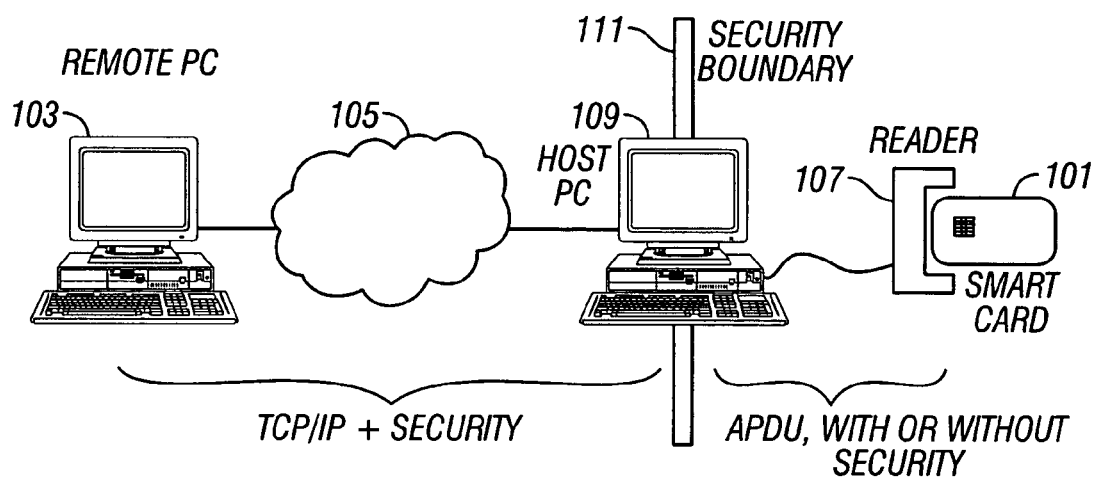
FIG. 1 is a schematic illustration of one prior art mechanism for connecting a smart card to a remote computer via a network, e.g., the Internet.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. In the accompanying drawings, numerals that are given a parenthetical modifier indicates one species of a class of like elements, e.g., smart card 201(x), indicates that the referred to element is version x of the greater class smart cards 201. Furthermore, primes (') and double-primes (") are used to indicate distinct individuals of the same element; e.g., smart card 201(c) and 201(c)' are identical in all aspects relevant to the particular illustration, but are different smart cards. As shown in the drawings for purposes of illustration, the invention is embodied in novel resource-constrained devices, such as a smart cards, USB dongles (such as the iKey device sold by SafeNet, Inc.), or SD Cards, or secure integrated circuit chips soldered directly to PC motherboards, that may act as a network node and which is capable of communicating in a secure manner with other nodes using standard communications protocols and services. A resource-constrained device, according to the invention, provides an implementation of an Internet communications protocol stack such that it can act as a standalone Internet node and communicate with other nodes on the Internet in a secure manner. A resource-constrained device according to the invention is fully capable of having the security boundary located on the resource-constrained device rather than on the host.

2. Deployment Scenario

Figure 2:
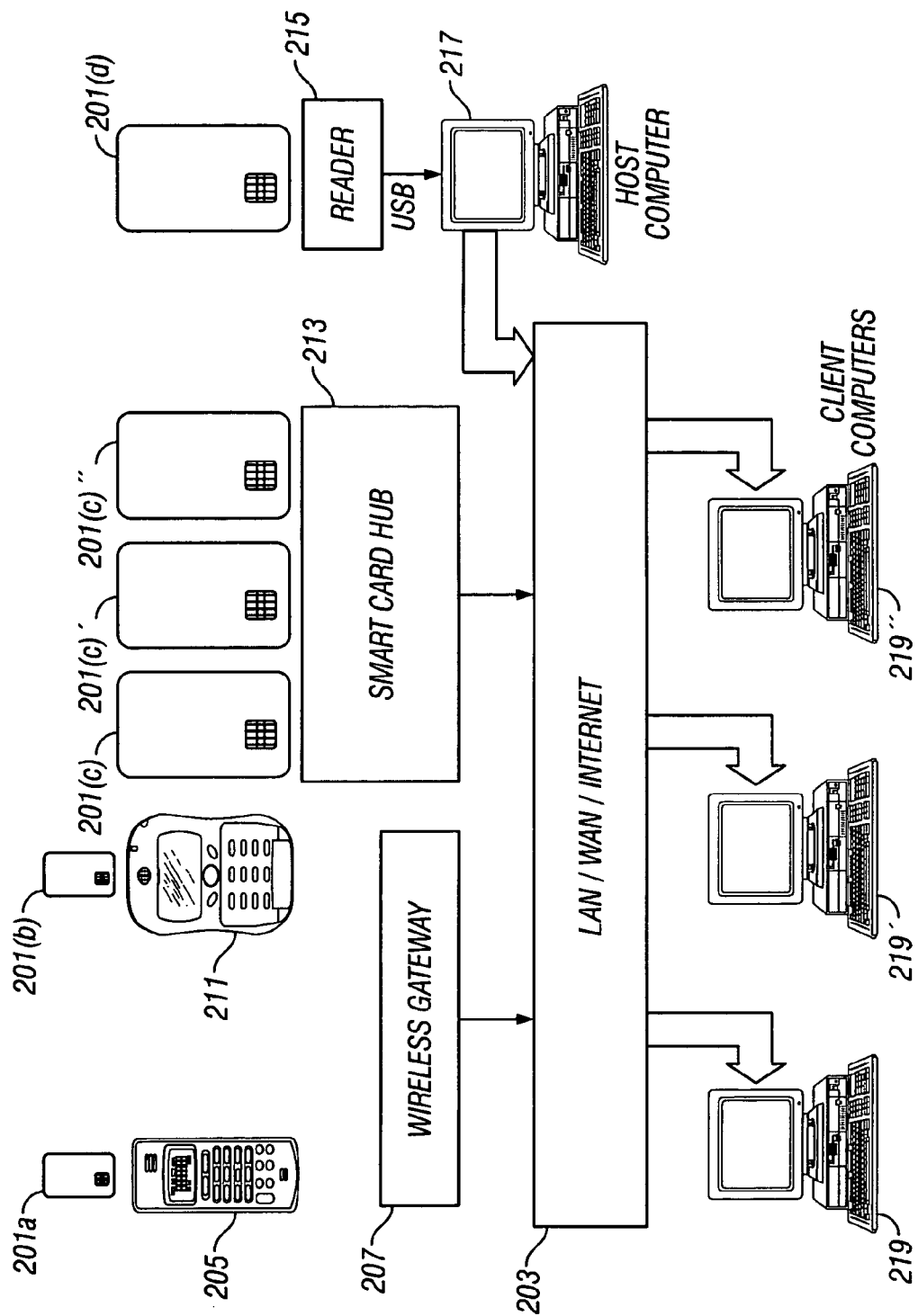
FIG. 2 is a schematic illustration of a deployment scenario for resource-constrained devices according to the invention.

FIG. 2 is a schematic illustration of a deployment scenario for resource-constrained devices according to the invention. In the illustration of FIG. 2, for exemplary purposes, the resource-constrained devices are network smart cards 201(a)-201(f) according to the invention. Network smart card 201(a) is a GSM subscriber identity module (usually referred to as a SIM card) connected to a network 203 via a GSM telephone handset 205 and a wireless gateway 207. Network smart card 201(b) is a network smart card connected to the network 203 via a wireless handheld computer 209, e.g., a personal digital assistant or a notebook computer. Network smart cards 201(c), 201(c)', and 201(c)" are connected to the network 203 via a smart card hub 213. Finally, network smart card 201(d) is connected to the network 203 via a smart card reader 215 connected to a host computer 217. The smart card reader 215 may be a USB connector such as the e-gate connector marketed by Axalto (formerly SchlumbergerSema). The network 203 may be a LAN, a WAN, or the Internet, or any combination of the three. A typical scenario would be to have a network card 201 connected to a device (e.g., a host or a reader) that is connected to a LAN which, in turn, is connected to the Internet via a WAN.

Any given deployment of network smart cards can include a combination of types of network cards 201 and other resource-constrained devices.

As described in greater detail hereinbelow, once the network connection has been established, various other nodes connected to the network 203, e.g., client computers 219, 219', and 219", may access the services provided by any given network card 201 in a secure manner from any physical location on the network 203. For example, an authentication service of a network smart card 201 plugged into a computer 217 or a mobile phone 205 in Austin, Tex. may be accessed via a client computer 219 in Paris, France to permit access to a secure database.

3. Communications Software Modules for Smart Card

Figure 3A:
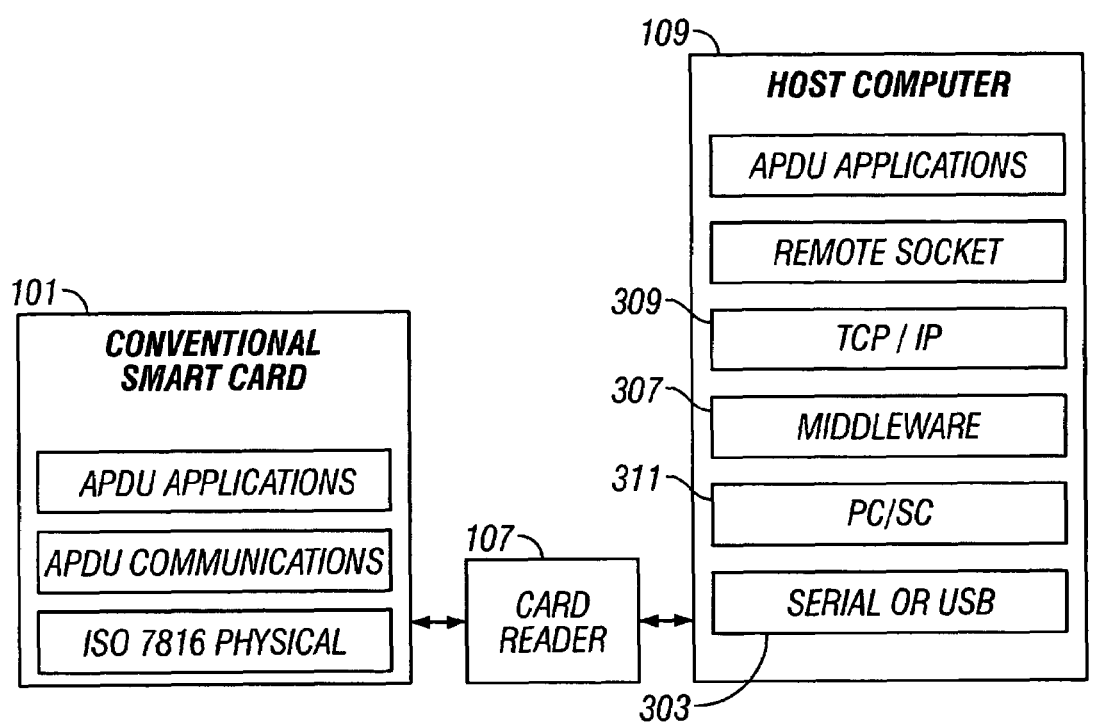
FIG. 3(a) is a schematic illustration of a communications software modules on a conventional smart card and host computer connected to each other via a card reader.

FIG. 3(a) is a schematic illustration of the communications software modules on a conventional smart card 101 and host computer 109 connected to each other via a card reader 107. In this conventional approach, communication between the smart card 101 and the network (not show in FIG. 3(a)) is accomplished by having all the actual interaction with the network occur between the host computer 109 and the network. For that purpose, the host computer has special middleware 307 that provides the interface functionality between network software 309 and pc-to-smart card (PC/SC) software 311. Physical layer communication between the card 101 and host 109 relies on ISO 7816 on either a serial or a USB connection.

As can be appreciated from FIG. 3(a), the host computer 109 is loaded with several pieces of special purpose software. It would be desirable to accomplish communication between a smart card and the network without requiring any special infrastructure.

Figure 3B:
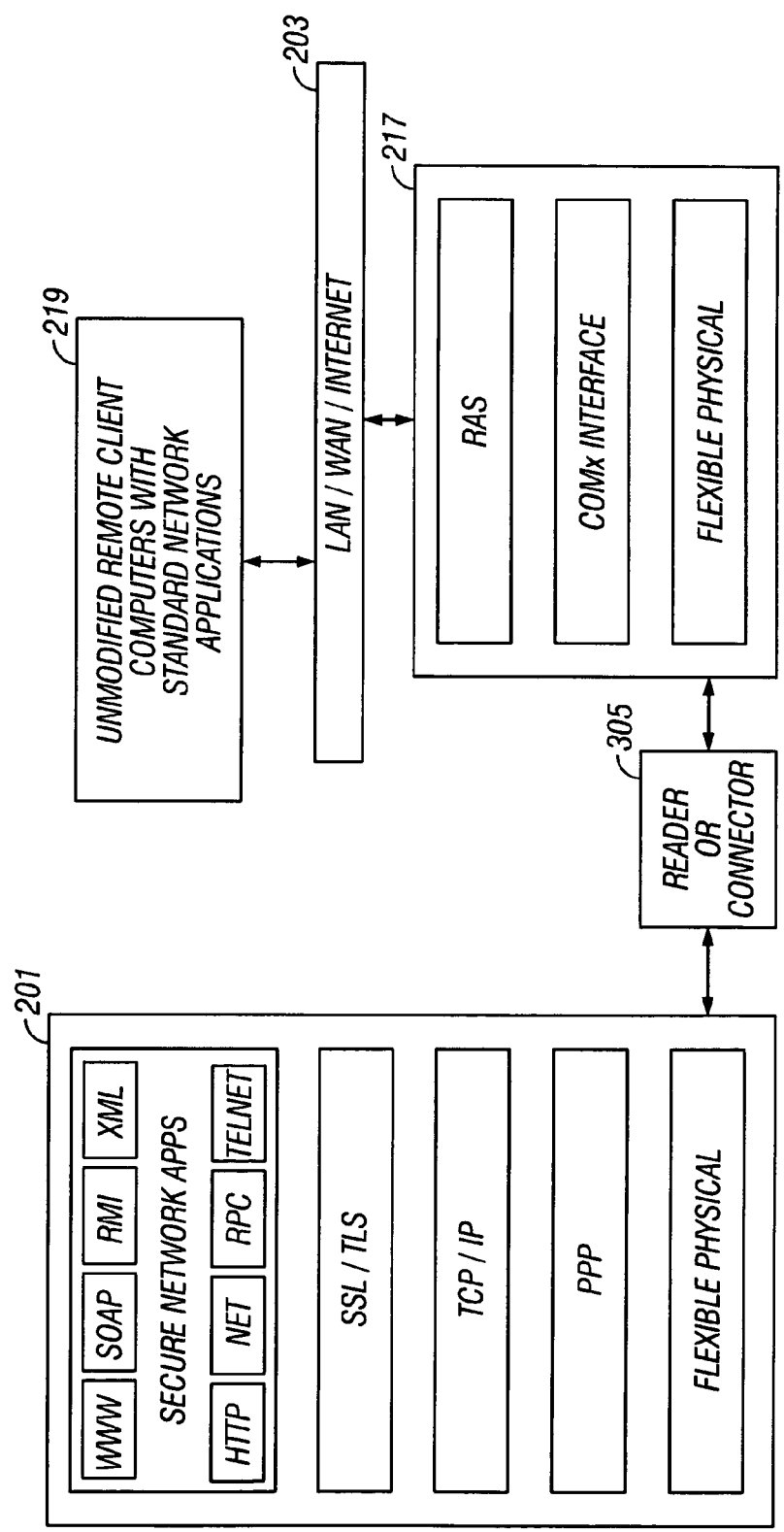
FIG. 3(b) is a schematic illustration of an infrastructureless network smart card connected via an unmodified host computer to a network and, through the network, to a remote client computer.

FIG. 3(b) is a schematic illustration of an infrastructureless network smart card 201 connected via an unmodified host computer 217 to a network 203 and, through the network 203, to a remote client computer 219. The remote client computer 219 interacts with the smart card 201 using standard network applications, e.g., Netscape Navigator, Microsoft Internet Explorer, telnet applications, or any other application designed to communicate with other Internet nodes using standard Internet protocols such as TCP/IP, PPP, SSL, etc.

4. Smart Card as an Internet Node

Figure 4A:
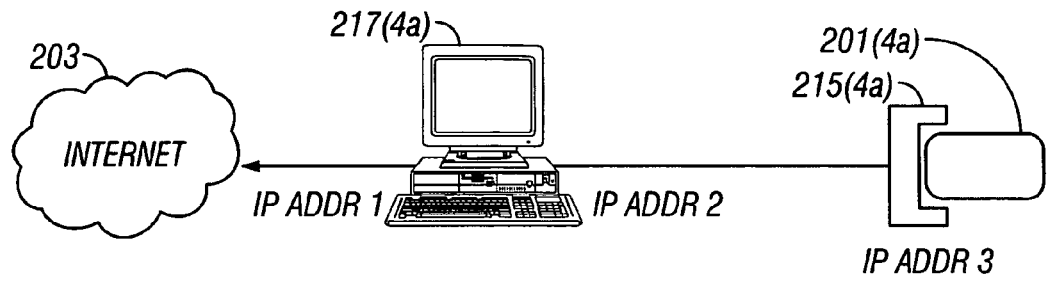
FIG. 4(a) is an illustration of a first alternative for connecting an infrastructureless network smart card according to the invention to a network.

FIG. 4(a) is an illustration of a first alternative for connecting an infrastructureless network smart card according to the invention to a network. The infrastructureless network smart card 201(4a) is connected to a reader 215(4a) which is connected to a host computer 217(4a). The computer 217(4a) is connected to a network 203. The computer 217(4a) acts as a router for routing Internet communications to and from the card 201(4a). The computer 217(4a) has a first IP address for its connection to the network 203 and a second IP address for connections to the infrastructureless network smart card 201(4a). There is a third IP address associated with the infrastructureless network smart card 201(4a). The third IP address may be either assigned to the card 201(4a) or allocated dynamically.

Figure 4B:
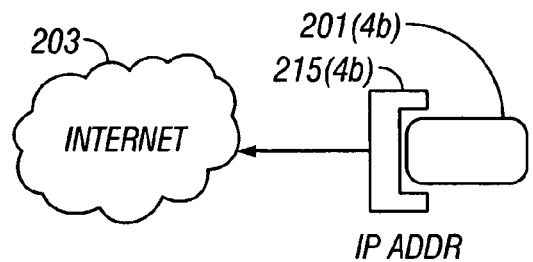
FIG. 4(b) is an illustration of a second alternative for connecting an infrastructureless network smart card to a network.

FIG. 4(b) is an illustration of a second alternative for connecting an infrastructureless network smart card 201(4b) to a network 203. In the second alternative the card reader 215(4b) is connected directly to the network 203.

In each of these two alternatives the card 201 has its own IP address, which may be statically assigned to the card or be obtained dynamically. The card 201 implements a network protocol suite, e.g., the TCP/IP protocol suite, thereby permitting the card 201 to communicate with other Internet nodes using Internet standard protocols and applications without requiring a proxy. The infrastructureless network smart card 201 communications protocol stack is described in greater detail below.

5. Communications Protocol Stack for Infrastructureless Network Smart Card

Figure 5:
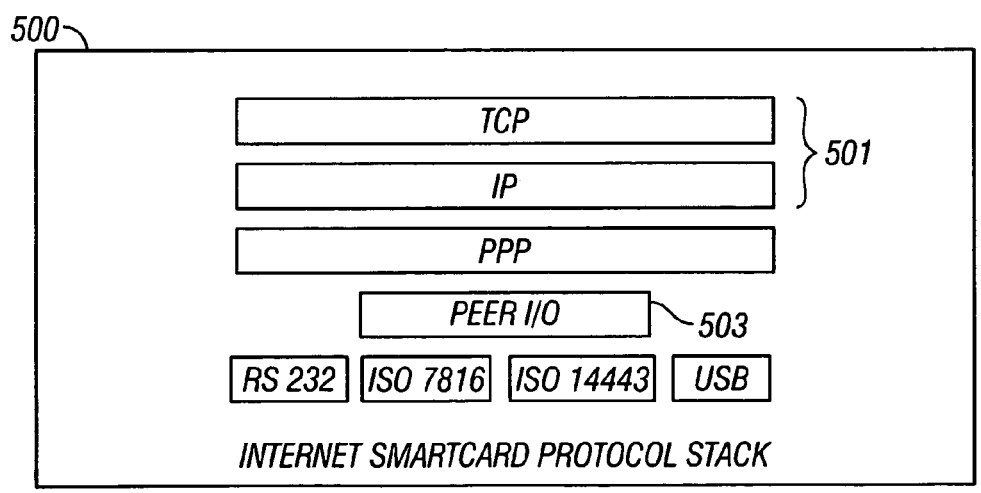
FIG. 5 is a schematic illustration of the communications protocol stack for the infrastructureless network smart card according to one embodiment of the invention.

FIG. 5 is a schematic illustration of a communications protocol stack 500 for the infrastructureless network smart card 201 according to one embodiment of the invention. The Internet smart card 201 has a TCP/IP protocol stack 501 on the card in order to be a standalone Internet node. Depending on the I/O characteristics of the card 201 and its physical connection with the external device, the smart card may have various link layer protocols. One way to connect the card 201 to the Internet 203 is by connecting a smart card reader 215, via a serial cable, to a host computer 215 that has an Internet connection. Supposing that the host computer 215 is running the Microsoft Windows operating system, Windows defines the direct serial cable connection as a modem type. Remote Access Server (RAS), which is part of the Windows installation on the host computer 215, provides services that enable a dial-in device, in this case the smart card 201, to connect to the Internet 203. RAS uses Point-to-Point protocol (PPP) to communicate with the dial-in device, the client. The client initiates the PPP negotiation. RAS can acquire an IP address via DHCP for the client. After the PPP connection is established with the client, RAS acts as a router between the Internet and the client. Other operating systems, such as Linux, also define remote access via PPP. The method presented here is not limited to the Windows operating system.

Smart cards usually communicate using half-duplex. This constraint presents a challenge to having smart cards communicate as full-fledged Internet nodes.

With standard full-duplex serial I/O, a device can connect to the serial port (COM port) of a PC (e.g., a host computer 215) and establish a connection with RAS to gain Internet access without loading any additional software on the PC. Since RAS communicates using PPP, a smart card according to one embodiment of the invention, implements PPP to connect to a PC via a serial connection in addition to implementing TCP/IP.

Thus, if the smart card 201 has full-duplex serial I/O, then just like other full-duplex serial device, the smart card 201 with TCP/IP/PPP can establish an Internet connection via RAS without loading any additional software on the host computer 215. However, the smart card ISO standards specify half-duplex I/O. The smart card contact I/O interface follows ISO 7816 protocol and the contact-less I/O interface follows ISO 14443 protocol. Smart cards with USB I/O interface are recent products. Currently, the USB smart cards also use ISO 7816 protocol (ISO 7816-12 is currently being formulated for USB smart cards), but this protocol merely encapsulates the ISO 7816 APDUs, and still suffers from the limitations of the ISO 7816 protocol.

In addition to the full duplex vs. half-duplex problem, Internet protocols are peer-to-peer, i.e., any node can initiate communication when it so desires, while ISO 7816 and ISO 14443 protocols specify command/response operation in which the smart card responds to a command issued by the host. To solve these two problems, one embodiment of the invention is a new protocol, referred to herein as the "Peer I/O" protocol 503. Peer I/O 503 provides a mechanism for half-duplex command/response protocols to support full-duplex peer-to-peer Internet protocols. The Peer I/O protocol 503 is described in greater detail herein below.

In the future there may be smart cards that have full USB capabilities, including logical full duplex mode. For full duplex serial and full (not ISO 7816-12) USB cards, the standard protocols support Internet protocols directly and Peer I/O is not required. However, for present and future protocols which, like ISO 7816, do not directly support peer-to-peer interactions, Peer I/O may be used so that the invention described herein can be adapted to those situations.

Which protocols are implemented in the protocol stack 500 on the Internet smart card 201 depends on the physical link between the smart card 201 and the host computer 217 and any intervening devices. The TCP/IP protocol suite is required for Internet communication. The protocols below the TCP/IP layer may change according to the physical link between a device and the Internet. For embodiments of the invention with a half-duplex serial link or contact-less link, Peer I/O 503 is used and smart cards 201, smart card readers 215 and host computers 217 implement Peer I/O in the form of Peer I/O server and client software modules. These modules are described in greater detail below.

In alternative embodiments, USB is the physical link between smart cards and terminals. The following section explores various mechanisms for connecting Internet smart cards using a USB link, where the card may or may not have USB. These mechanisms affect the protocol stack below the TCP/IP layer on the smart card.

6. Physical Layer and Link Layer Connections

Figure 6A:
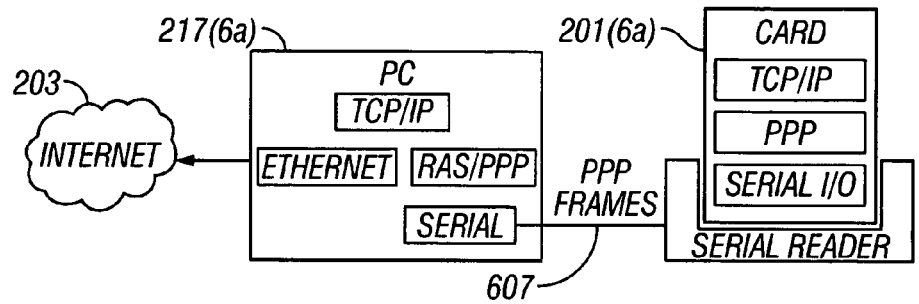
FIG. 6(a) is a schematic illustration of the components for implementing communication between a smart card and a network wherein the smart card communicates to a host computer using a serial connection having full-duplex serial I/O.
Figure 6B:
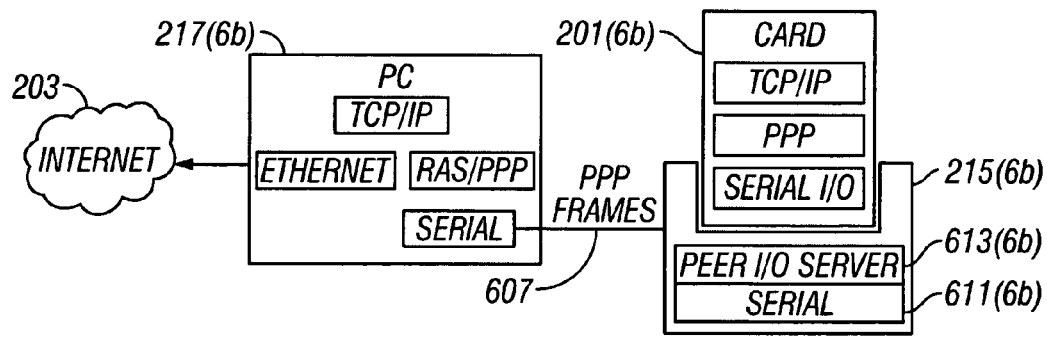
FIG. 6(b) is a schematic illustration of the components for implementing communication between a smart card and a network wherein the smart card communicates to a smart card reader using a serial connection having half-duplex serial I/O.
Figure 6C:
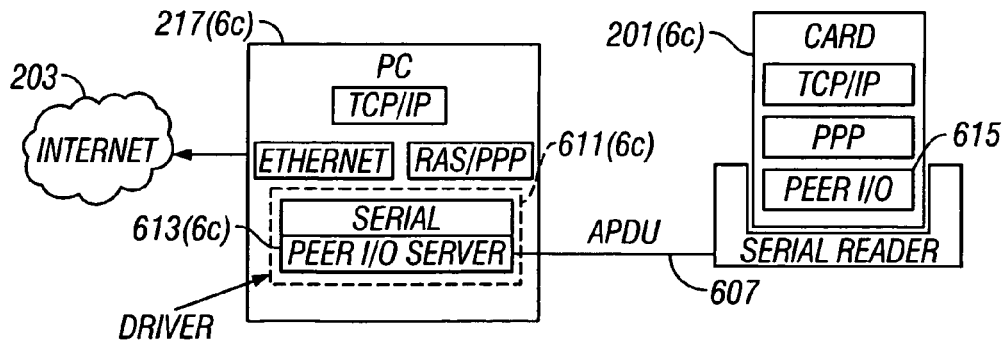
FIG. 6(c) is a schematic illustration of the components for implementing communication between a smart card and a network wherein the smart card communicates to a host computer using a serial connection having half-duplex serial I/O.

There are several ways of providing physical and link layer connections for Internet smart cards according to the invention. Physical connections include serial connections (e.g., RS-232), USB connections and contact-less connections. The sections that follow describe these physical connections and link layer connections implemented on those physical connections. FIGS. 6(*a*) through 6(*c*) are illustrations of serial link implementations of the invention and FIGS. 7(*a*) through 7(*c*) are illustrations showing USB implementations of the invention. The communication protocol for the contact-less connection is similar to the communication protocol described above for the half-duplex serial connection (FIGS. 6(*b*) and 6(*c*)). In the FIGS. 6(*a*) through 6(*c*) and 7(*a*) through 7(*c*), the readers might be internal or external to the host computer.

6.1. Serial Connection

FIGS. 6(*a*) through 6(*c*) are schematic illustrations of components for implementing communication between smart cards 201 and a network 203 using a serial connection 607.

FIG. 6(*a*) is a schematic illustration of the components for implementing communication between a smart card 201(6*a*) and a network 203 wherein the smart card 201(6*a*) communicates to a host computer 217(6*a*) using a serial connection 607 having full-duplex serial I/O. For smart cards 201 that have full duplex serial I/O, the link layer on the card 201 is an implementation of PPP on the card. No additional software, beyond that which is normally found on a PC, is needed on the host PC 217(6*a*). With an established PPP connection between the card 201(6*a*) and the PC 217(6*a*), the card becomes a standalone Internet node.

FIG. 6(*b*) is a schematic illustration of an alternative method for connecting a smart card and a network, in which a smart card 201(6*b*) communicates with the network 203 through an ISO standard half-duplex interface via a smartcard reader 215(6*b*) and a host computer 217(6*b*). The smart card reader 215(6*b*) provides an implementation of the Peer I/O Server 613(6*b*), described in greater detail herein below. The smart card reader 215(6*b*) connects to the smart card 201(6*b*) through an ISO standard half-duplex I/O interface and to a host computer 217(6*b*) via a standard full-duplex I/O interface 607. Because the smart card reader 215(6*b*) completely handles the ISO 7816 protocol, and connects to the host computer 217(6*b*) using standard serial protocol, no additional software, beyond that which is normally found on a PC, is needed on the host PC 217(6*b*).

FIG. 6(*c*) is a schematic illustration of the components for implementing communication between a smart card 601(6*c*) and a network 203 wherein the smart card 601(6*c*) communicates to a host computer 217(6*c*) using a serial connection 607(6*c*) having half-duplex serial I/O. The current smart card standard specifies half-duplex I/O interface, ISO 7816 for contact card and ISO 14443 for contact-less card. According to the invention, a special protocol (Peer I/O) described herein below, enables the half-duplex command/response protocol to support the full-duplex peer-to-peer communication according to Internet communications protocol. A driver 611 (6*c*) on the PC 217(6*c*) is used to implement a Peer I/O server 613(6*c*); this is the only additional software added to the PC 217(6*c*). The driver 611 behaves as a normal COM port from the Windows perspective so that RAS connection is set to the Peer I/O COM port. Furthermore, a Peer I/O client 615 on the smart card 201(6*c*) is used to implement the card-side of the Peer I/O protocol.

6.2. USB Connection

The Universal Serial Bus, USB, is gaining popularity for its many good features including high data rate (12 Mbps for USB v1.1 and 480 Mbps for USB v2.0), plug and play, expandability (up to 127 devices), external to PC, power management, and power supplied by cable. The legacy connection ports, such as serial and parallel ports, and legacy expansion buses like ISA and PCI are being eliminated in future mainstream PCs and are being replaced by USB. At the same time, smart card chip vendors are starting to put USB interfaces on smart card chips. There are several methods for enabling Internet smart cards using USB, for example, as described herein below.

6.3. Serial/USB Reader

FIG. 7(*a*) is a schematic illustration of the components of connecting a network smart card 201(7*a*) to a network 203 via a host computer 217(7*a*) over a USB using a serial-to-USB reader 709. The smart card 201(7*a*) is ISO 7816 compliant with serial I/O. The card protocol stack includes TCP/IP, PPP and a Peer I/O client module 615. The reader has a Peer I/O server 613 and logic 715 to perform a USB-to-serial conversion. The reader 709 connects to the host computer 217(7*a*) via a USB port 711. A COM (serial) port driver 713 on the host computer 217(7*a*) performs a serial-to-USB conversion. With the COM (serial) port driver 713, the USB port 711 appears as a COM port to the host computer 217(7*a*) and RAS can use this USB COM port for connection. A COM (serial) port driver 713 is available from FTDI (http://www.ftdichip.con/us232.htm).

6.4. USB Reader

FIG. 7(*b*) is a schematic illustration of the components of connecting a network smart card 201(7*a*) to a network 203 via a host computer 217(7*b*) over a USB using a USB reader 709(7*b*). In contrast to the serial/USB reader embodiment of FIG. 7(*a*), the Peer I/O server 613(7*b*) is located in the driver 717 on the host computer 217(7*b*). The driver 717 also does serial-to-USB conversion 719, thereby appearing as a COM port. The RAS (PPP server) can use this COM port for direct connection.

6.5. USB with Remote NDIS

FIG. 7(*c*) is a schematic illustration of the components of an alternative embodiment for connecting a network smart card 201 to a network 203 via a host computer 217. A smart card 201(7*c*) is connected to a host computer 217(7*c*) over a USB link 701 using a USB reader 709(7*b*). In this embodiment no additional driver is required on the host 217(7*c*) side. The smart card 201(7*c*) has a full speed USB driver 727 and a Remote NDIS driver 721. The card 201(7*c*) is a network device and there is no need for either RAS or PPP.

The smart card side protocol stack includes DHCP, TCP, UDP, IP, collectively, IP layer 723, an Ethernet driver 725 and the Remote NDIS device driver 721. The Ethernet driver 725 manages Ethernet frames received from and transmitted to the remote NDIS device driver 721. For the incoming packets, the Ethernet driver 725 either handles them or takes out the payload and passes the payload to the IP layer 723. The out-going IP datagrams from the IP layer 723 are framed with Ethernet headers and trailers by the Ethernet driver 725 and are sent out via Remote NDIS layer 721. The smart card behaves as a virtual Ethernet device. If the smart card is only used for local network connection, the DHCP is not required.

The USB smart card 201(7*c*) may be in the form of a USB token that can be plugged into a PC USB slot directly, i.e., bypassing a separate or distinct USB reader 709(7*b*). Once plugged in, the smart card 201(7*c*) is initialized at the USB level. Using the Remote NDIS message protocol, the host 217(7*c*) configures the smart card 201(7*c*) as a new network adaptor. The host 217(7*c*) and the smart card 201(7*c*) can then send Ethernet packets to each other.

6.6. Ethernet over USB Protocol

A new USB standard is emerging which encapsulates Ethernet protocol directly on USB. The result is exactly like FIG. 7(*c*), except that RNDIS is replaced by Ethernet over USB. This protocol directly bridges between USB and Ethernet and is less complex than RNDIS. The advantages are the same as the RDNIS solution: no additional driver is required on the host 217(7*c*), the card 201(7*c*) is a network device, and there is no need for either RAS or PPP. Just as with Remote NDIS message protocol, with Ethernet over USB the host 217(7*c*) configures the smart card 201(7*c*) as a new network adaptor. The host 217(7*c*) and the smart card 201(7*c*) can then send Ethernet packets to each other, using any available protocol including DHCP, TCP, UDP, IP, SSL, and TLS, to name a few.

6.7. SPI Connection

In an alternative embodiment the communication between the smart card 201 and the host computer 217 uses a Serial Peripheral Interface. The Serial Peripheral Interface (SPI), named by Motorola and also known as Microwire, trademark of National Semiconductor, is a full-duplex synchronous serial interface for communications between a microprocessor and its peripheral devices. Two microprocessors can also communicate using SPI. SPI devices communicate using a master/slave relationship over four wires, two control lines and two data lines. The maximum communication speed is 20 Mbits/second. Currently, SPI is mainly used in analog/digital converters, memories (EEPROM and flash), Real Time Clocks (RTC) and others. Some smart card chips include SPI, and some smart card readers have SPI connections to the host computers as well. However, SPI is defined at the bus level and the intermediate level connection protocol is yet to be standardized.

It is possible to achieve networking functionalities for smart cards with SPI connections. Because there are two interfaces involved, card/reader interface and reader/terminal interface, and because the connection can be serial, contactless, USB, or SPI, the combination of the interfaces result in various categories of possibilities of connecting a smart card to a host computer using SPI. The following list these categories and propose network smart card solutions using SPI. These solutions are examples and other solutions are possible.

In a first alternative embodiment using SPI, the card and reader interface is SPI; and the reader and terminal interface is another connection, such as serial or USB. This alternative presents two possibilities:

a. The reader/terminal interface is full duplex serial. A RAS connection can be used. A driver is required on the PC side. The SPI driver on the card side must be able to carry PPP frames.

b. The reader/terminal interface is USB. The methods proposed in conjunction with the discussion of FIGS. 7(*a*) through 7(*c*) apply here as well. The SPI driver on the card side must be able to carry PPP frames or Ethernet frames, depending on the solution used on the terminal side.

In a second alternative, the reader and terminal interface is SPI; and the card and reader interface is another connection, such as ISO 7816 for contact card, ISO 14443 for contactless card, or USB. This alternative presents two possibilities:

a. The card/reader interface is ISO 7816 or ISO 14443. Peer IO is required. The card has Peer IO client. The reader or the terminal has the Peer IO server. The host side also needs a driver for RAS connection.

b. The card/reader interface is USB. The host side needs a driver for network connection. The card side needs a driver to carry link layer frames.

In a third alternative embodiment the card and terminal connect directly via SPI. Each of the card and terminal contain corresponding driver modules implementing a link layer protocol defined for PPP, IP, or Ethernet connection.

Figure 7A:
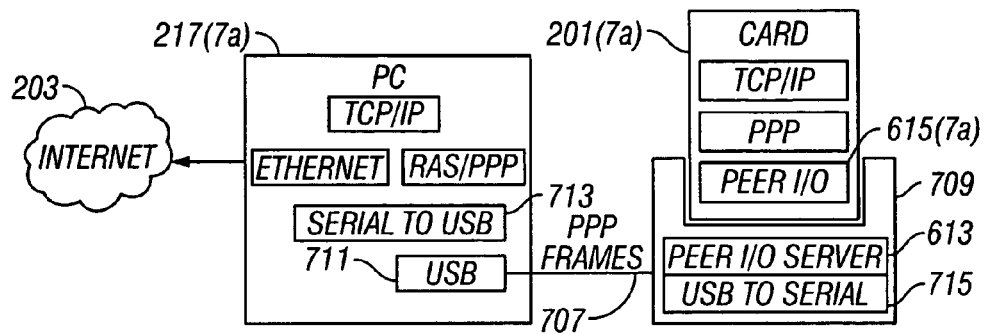
FIG. 7(a) is a schematic illustration of the components of connecting a network smart card to a network via a host computer over a USB using a serial-to-USB reader.
Figure 7B:
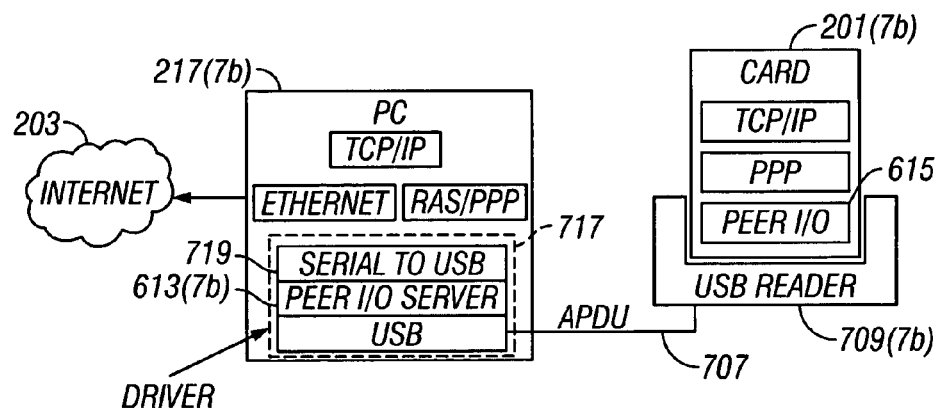
FIG. 7(b) is a schematic illustration of the components of connecting a network smart card to a network via a host computer over a USB using a USB reader.
Figure 7C:
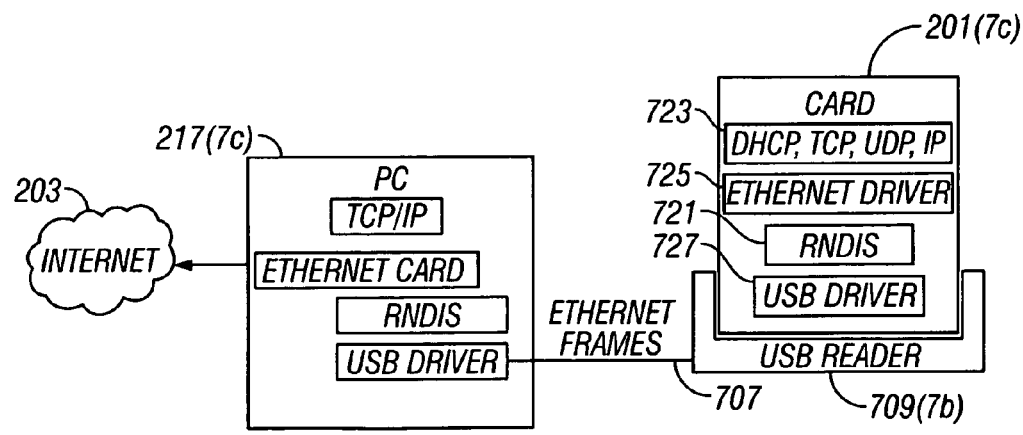
FIG. 7(c) is a schematic illustration of the components of an alternative embodiment for connecting a network smart card to a network via a host computer over a USB using a USB reader.
Figure 7D:
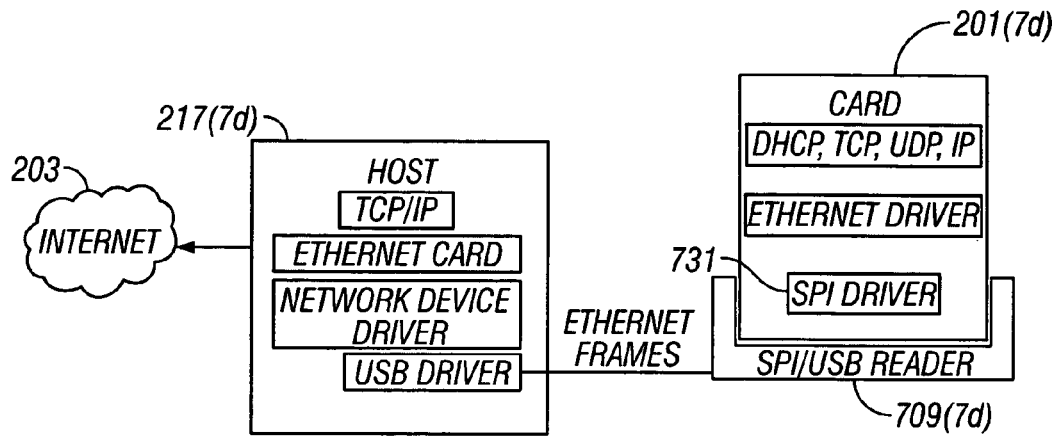
FIG. 7(d) is a schematic illustration of the components for connecting a network smart card to a network using SPI according to the arrangement in which the card/reader interface is SPI and the reader/host interface in USB.

FIG. 7(d) is a schematic illustration of the components for connecting a network smart card to a network using SPI according to the arrangement in which the card/reader interface is SPI and the reader/host interface is USB. The card 201(7d) includes an SPI driver 731. The smart card 201(7d) is connected to the network via an SPI/USB reader 709(7d) which is capable of communicating using SPI with the smart card and to be connected to a host 217(7d) using the USB protocol. The SPI/USB reader 709(7d) communicates with a USB driver 711 located on the host 217(7d) for communicating Ethernet frames between the host 217(7d) and the smart card 201(7d).

6.8. MMC

In another alternative embodiment the invention described herein is employed to connect MultiMediaCards (MMC) to a network. In this embodiment, MMC cards have much the same role as the network smart cards 201 described herein.

MultiMediaCards (MMC) are small (24 mm×32 mm or 18 mm×1.4 mm), removable, solid-state memory cards for mobile applications, such as cell phones, digital cameras, MP-3 music players, and PDAs. The storage capacity of a MMC is up to 1 Gbyte of data. High speed MMC can transfer data up to 52 Mbits/second. MMCs use flash technology for read/write applications and ROM or flash technology for read only applications.

An MMC has a seven-pin serial interface, which has three communication lines (command, clock and data) and four supply lines. The MMC initialization and data transfer are based on the MMC bus protocol. Each message uses one of the three tokens: Command, Response and Data. A command token starts an operation, which is sent from the host to one or more cards. The response token is sent from the addressed card or cards to the host. The data token can go either way. All bits on the data and command lines are transferred synchronously with the clock.

The Secure MultiMediaCard (Secure MMC) adds smart card security features into the MMC for content protection and e-commerce. It has a tamper resistant module for secure storage and does encryptions and authentication within the card. For example, Infineon Technologies uses its smart card hardware technology in its Secure MMC. The Secure MMC is fully compatible with standard MMC.

Recently, the MultiMediaCard Association (www.mmca.org) has formed a working group to standardize the next generation of Secure MultiMediaCard (Secure MMC) (www.mmca.org/press/SecurityFinal.pdf). The new specification V.2.0 defines an extension to the MMC standard protocol to create a communication interface for incorporating smart card technology. This enables the MMC to provide smart card security features, such as encryption and authentication. The extended MMC command set enables the MMC interface to carry standard smart card ISO-7816 APDUs.

Figure 7E:
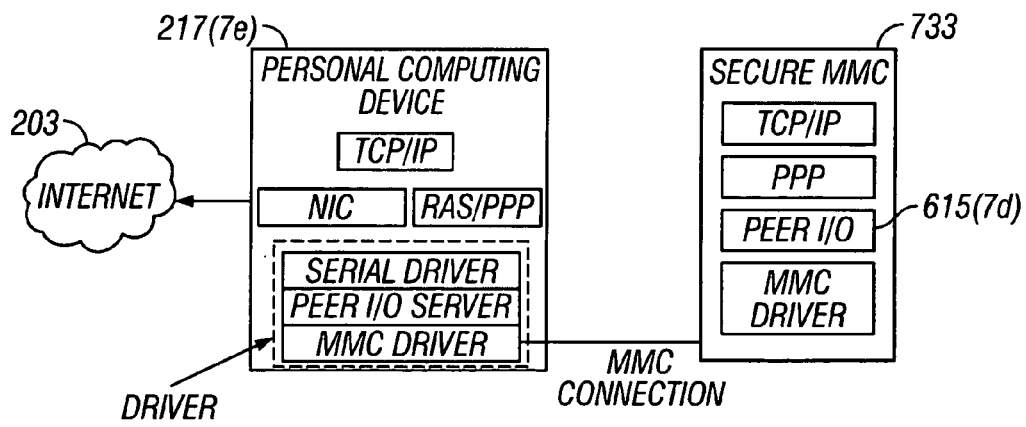
FIG. 7(e) In this embodiment, the Peer I/O protocol (described in greater detail below) is implemented in a Peer I/O client 615(7d) using the MMC bus protocol to carry Internet protocol data, for example, PPP frames.

The invention described herein for enabling smart cards to be Internet nodes also applies to future Secure MMCs and is illustrated in FIG. 7(e). In this embodiment, the Peer I/O protocol (described in greater detail below) is implemented in a Peer I/O client 615(7d) using the MMC bus protocol to carry Internet protocol data, for example, PPP frames. The SPI is another communication interface to MMC, in addition to MMC bus. Some MMC cards allow selecting MMC or SPI mode. Therefore, the methods presented above in the section describing use of SPI in a network smart card apply to Secure MMC as well. The Secure MMC may also use other multimedia transport protocols to communicate with the host or the network. FIG. 7(e) illustrates one example configuration for making Secure MMC as an Internet node. Other examples include replacing PPP and Peer I/O by other link layer protocols and replacing TCP by other transport protocols, such as UDP.

7. Peer I/O Protocol

The Peer I/O client 615 and Peer I/O server 613' are implementations of the client and server side of a link layer protocol, the Peer I/O protocol. The current smart card standard ISO 7816 (ISO 14443 for contact-less card) specifies a half-duplex command/response communication protocol while standard Internet protocols, such as PPP, IP, and TCP, operate in a full-duplex and peer-to-peer mode. A smart card compliant with ISO 7816 (or ISO 14443) standard that implements the Peer I/O protocol in a Peer I/O client 615 may act as an Internet smart card.

7.1. Features of the Peer I/O Protocol

The purpose of the Peer I/O protocol is to bridge the ISO 7816 (or ISO 14443) protocol and Internet protocols. The Peer I/O is implemented on both the host PC (or reader) side and the card side. The Peer I/O protocol and the associated Peer I/O client and server modules perform the following functions:

Enable the card that operates in a command/response mode to communicate with network nodes (desktop, laptop, etc.) as a peer;

Enable the card with half-duplex communication hardware to handle full-duplex communication traffic;

Encapsulate upper layer protocol frames;

Enable to transport upper layer protocol frames longer than 256 bytes without fragmentation and de-fragmentation mechanisms;

Support multiple logical connections of upper layer protocols;

Provide independence from the upper layer protocols and from applications.

7.2. Peer I/O Module Architecture

Figure 8:
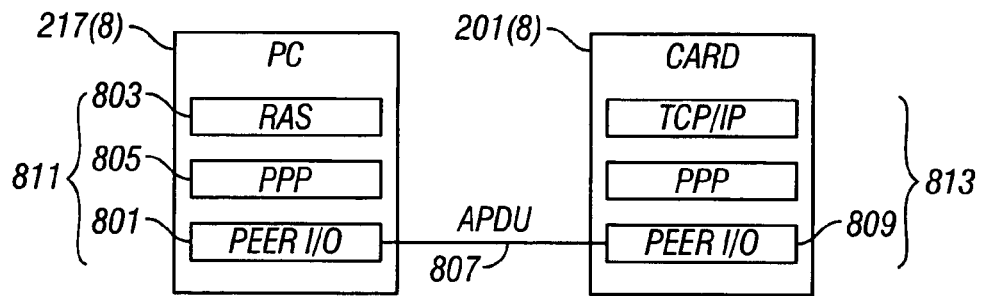
FIG. 8 is a high-level schematic diagram of the communications protocol stack, a host computer and a network smart card implementing the Peer I/O protocol in which APDU carries PPP frames.

FIG. 8 is a high-level schematic diagram of the communications protocol stacks a host computer 705 and a network smart card 701 implementing the Peer I/O protocol.

In embodiments of the invention that include the link-layer protocol introduced herein as Peer I/O, a Peer I/O module resides in both the host PC 217 (or reader 709) and in the card 201. The protocol stack 811 on the host PC side 217 (which may be any of the previously shown host PCs 217 that implement Peer I/O), a Peer I/O server module 613 implements the Peer I/O protocol layer 801 and provides services to forward messages between the card 201 and the Remote Access Server (RAS) 803 on the host computer 217. On the smart card 201 side, the protocol stack 813 contains a Peer I/O protocol layer 809 that sits above APDU 807 and below other protocols, such as PPP 805. APDU provides the communications between the host 217(8) and the card 201(8). The Peer I/O protocol 801 is independent of the Internet protocol it carries. From an upper layer protocol point of view, Peer I/O

801 can carry messages to and from both directions. For example, Peer I/O 801 can be used to carry PPP frames or Ethernet frames or IP datagrams. Peer I/O uses APDU to carry messages, such as PPP frames, Ethernet frames or IP datagrams. The following description of Peer I/O uses RAS and PPP as an example. In this case, the Peer I/O uses APDU to carry PPP frames.

When RAS sends a message to the card 201, the Peer I/O server 613 forwards the message by sending one or more APDU commands containing the message to the card 201. To enable the card 201 to send a message to RAS, the Peer I/O server 613 polls the card 201 regularly. Finite State Machine, described in greater detail below, of the Peer I/O server 613 and the Peer I/O client 615 define a mechanism to forward messages of any length without using an explicit fragmentation and assembly mechanism.

The Peer I/O server 613 on the host side can be implemented as a COM port driver. In this way, no additional host software, except the Peer I/O COM port driver, is required on the host side. The discussion in conjunction with FIGS. 6(*b*), 6(*c*), 7(*a*) and 7(*b*) describes several ways of deploying Peer I/O.

7.3. Peer I/O Protocol Format

The following defines one implementation of Peer I/O. Peer I/O implementation is not limited to the following defined class, instruction, and status words set. The Peer I/O Protocol defines a new ISO 7816 class CLA=0x12 for Peer I/O protocol (ISO 7816-4 reserves 0x10-0x7F CLA numbers for future use. ISimplify uses 0x10). Three instructions are defined for this Peer I/O class, namely, POLL, GET_PACKET, and PUT_PACKET. The Peer I/O server uses POLL to poll the card to see if the card wants to send anything; uses GET_PACKET to get data from card; and uses PUT_PACKET to send data to the card. The Peer I/O protocol does not have its own protocol data unit. It uses APDU directly.

A Peer I/O command APDU has the following format:

| 0x12 | INS | Null | Null | Length | (Data) |
|------|-----|------|------|--------|--------|

The instruction INS can be one of the following:

POLL (0xE8): Length=1; Data is one arbitrary byte.

PUT_PACKET (0xEA) : Length is the number of bytes of Data sending to the card

GET_PACKET (0xEC) : Length is the number of bytes of Data receiving from the card The Length is one byte, so the maximum data length is 256 bytes. Note that POLL command sends one arbitrary byte. This is to avoid ISO 7816 Case I command, which no ACK be sent by the card and some readers do not work well with.

A response APDU has the following format:

| ACK | (Data) | SW1 SW2 |
|-----|--------|---------|

The ACK represents the acknowledgement from the card for receiving the command from the Peer I/O server. The ACK is the INC code of the received command. The status of the process on the card side is represented by SW1 and SW2 in the response APDU. For all the three Peer I/O instructions, response status can be the following:

READY-WRITExx (e.g., 6Cxx): xx represents the number of bytes that the card is ready to send.

NO-DATA (e.g., 9000): the card is ready to receive.

Warning or error status.

The reason to use 6Cxx for normal status is the following. The IOP API on the host side does not export status of the APDU command. So 6Cxx is used for the Peer I/O server to catch it as an exception.

7.4. Peer I/O Operation

When RAS sends data to the card, Peer I/O server issues a PUT_PACKET command to the card. The APDU contains the data.

| 0x12 | PUT_PACKET | Null | Null | Length | Data |
|------|------------|------|------|--------|------|

When the card wants to send a data to RAS, it has to wait for its opportunity. The Peer I/O server regularly polls to give the card opportunities to send. The server issues a POLL command.

| 0x12 | POLL | Null | Null | 1 | 1 |
|------|------|------|------|---|---|

After receiving a command APDU from Peer I/O server, the card responds with an ACK first. If the card has no data to send, it sets SW1 SW2 as NO-DATA (e.g., 90 00).

| ACK | 90 00 |
|-----|-------|

If the card has data to send, it sets SW1 SW2 as 6Cxx, where xx is the length of data that the card intends to send.

| ACK | 6C xx |
|-----|-------|

When Peer I/O server receives the response with status READY-WRITE (6Cxx), it issues a GET_PACKET command with Length=xx before issuing any other command.

| 0x12 | GET_PACKET | Null | Null | xx |
|------|------------|------|------|-----|

The card responds with a response APDU containing data.

| ACK | Data | SW1 SW2 |
|-----|------|---------|

When the SW1 SW2=6Cxx, the Peer I/O server can issue another GET_PACKET command.

7.5. Peer I/O Finite State Machines

Operation of the Peer I/O server 613 and the Peer I/O client 615 are controlled by two finite state machines, respectively.

Figure 9:
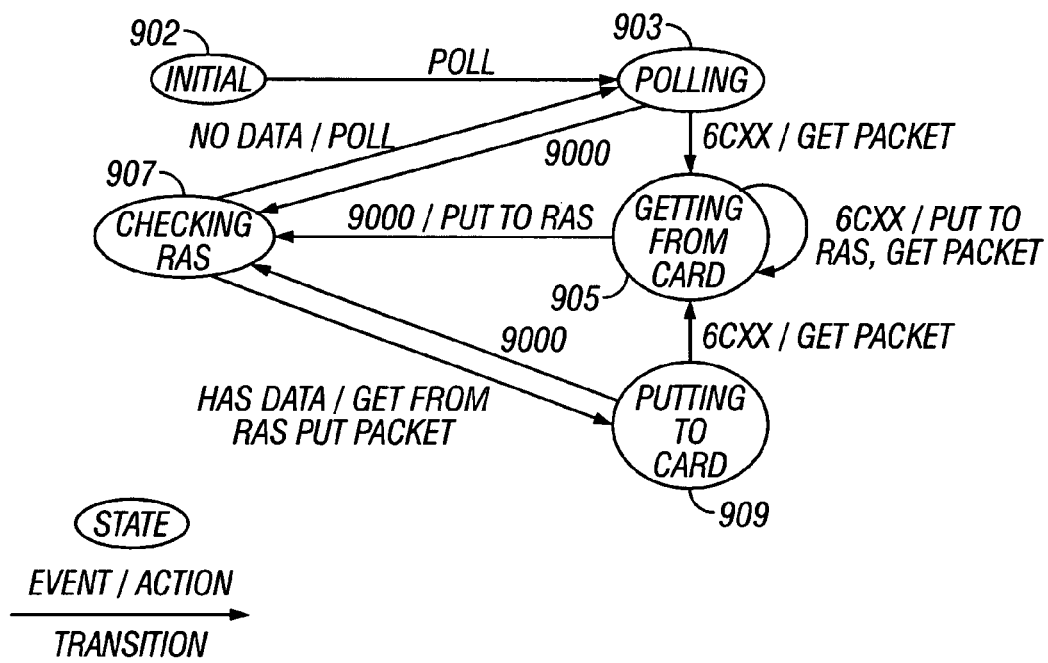
FIG. 9 is a schematic illustration of the finite state machine that controls the behavior of the Peer I/O server.

FIG. 9 is a schematic illustration of the finite state machine 901 that controls the behavior of the Peer I/O server 613.

The finite state machine (FSM) 901 has five states:

Initial state 902;

Polling 903;

Getting from card 905;

Putting to card 909; and

Checking RAS 907.

There are four events:

Two status from card (READY-WRITE (6Cxx) or NO-DATA (9000)) (READY-WRITE (6Cxx) indicates that the card has data to send and xx is the length of data that the card intends to send; NO-DATA (9000) is an indication from the card that it has no data to send)

Two results from checking RAS (no data or has data).

There are four actions:

Get packet from card

Put packet to card

Get from RAS

Put to RAS

The Peer I/O server 613 always starts in the Polling state 903 by polling the card. If the card returns status READY-WRITExx (6Cxx), that indicates the card having data to send and the Peer I/O server 613 transitions to the Getting-from-card state 905, gets data from the card by issuing GET_PACKET instructions with a value xx for the Length field, and forwards the data to RAS. The Peer I/O server 613 stays in the Getting-from-card state 905 and continues getting data from the card and forward data to RAS as long as the card returns status READY-WRITExx (6Cxx).

Whenever the card returns status NO-DATA (9000), that indicates the card has no data to send or is ready to receive, and the Peer I/O server 613, whether in the polling state 903 or in the Getting-from-card state 905, transitions to the Checking-RAS state 907, and checks with RAS to determine if RAS has data to send to the card. When RAS has data, the Peer I/O server 613, transitions to the Putting-to-card state 909, obtains that data from RAS and forwards the data to the card. If RAS has no data, the Peer I/O server 613, transitions back to the polling state 903, and again polls the card. While putting data to the card, the Peer I/O server 613 may obtain a message from the card that it wishes to transmit data. In this case the Peer I/O server 613 transitions to the Getting-from-card state 905. If however, the Peer I/O server 613 receives a NO-DATA message, the Peer I/O server 613 transitions back to the Checking-RAS state 907.

Figure 10:
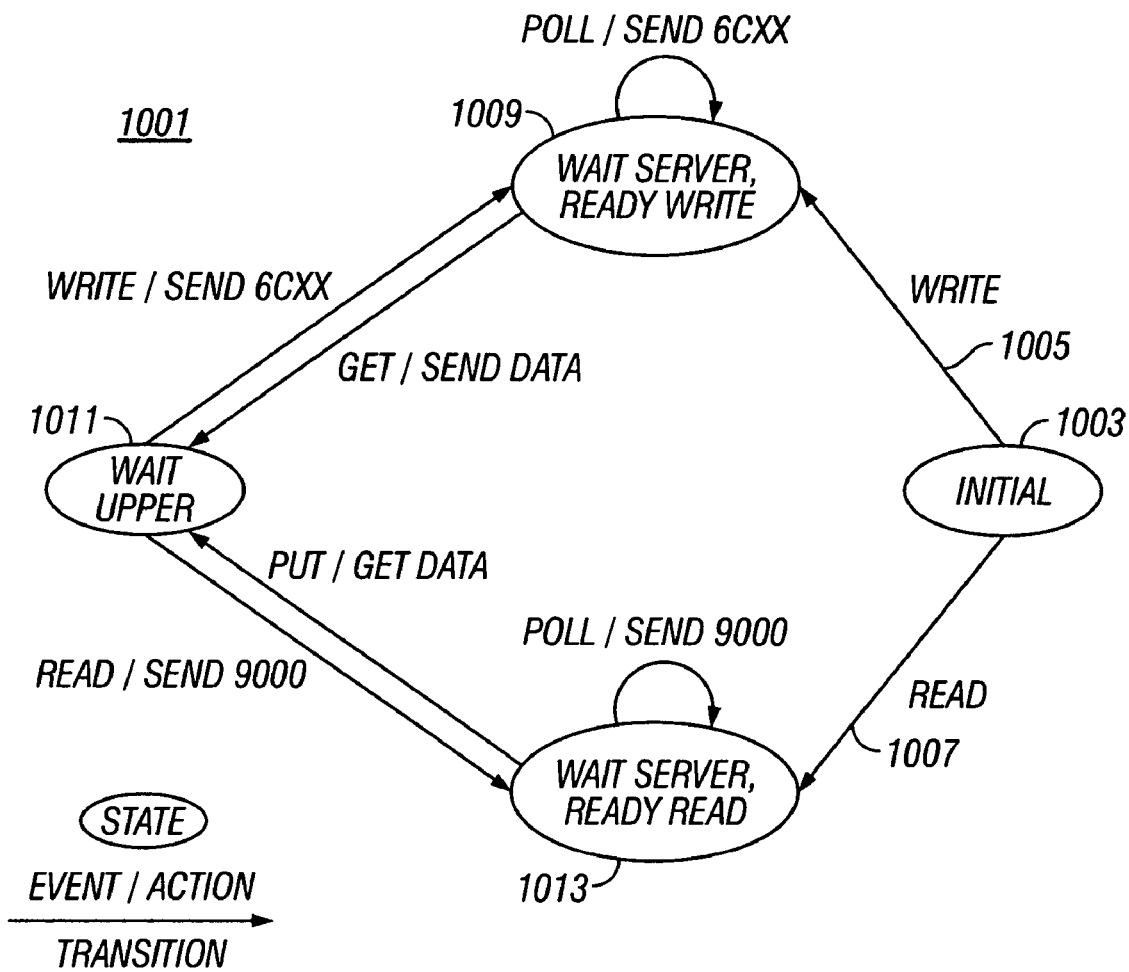
FIG. 10 is a schematic illustration of the finite state machine that controls the behavior of the Peer I/O client.

FIG. 10 is a schematic illustration of the finite state machine 1001 that controls the behavior of the Peer I/O Client 615.

There are four states:

Initial state 1003

Waiting upper layer instruction (read or write) 1011

(The upper layer is the standard protocol stack, i.e., TCP/IP.)

Ready write, waiting for the Peer I/O server 1009

Ready read, waiting for the Peer I/O server 1013

There are five events:

Read instruction from the upper layer

Write instruction from the upper layer

Poll command from the Peer I/O server

Put command from the Peer I/O server

Get command from the Peer I/O server.

There are four actions:

Send status READY-WRITExx (6Cxx) to the Peer I/O server

Send status NO-DATA (9000) to the Peer I/O server

Get data from the Peer I/O server

Send data to the Peer I/O server.

The card 201 contains a Peer I/O client 615. The Peer I/O client 615 starts at the initial state 1003. The upper layer may either request to write 1005 or to read 1007 and causes the Peer I/O client 615 to transition to Wait-Server-Ready-Write state 1009 or Wait-Server-Ready-Read state 1013, respectively. In one implementation, the application on the smart card sends the first message via the upper layer to initiate PPP connection. (Note: the Peer I/O protocol does not dictate who initiates connection.) The Peer I/O client 615 leaves its "initial" state 1003 and transitions to Wait-Server-Ready-Write state 1009 when the upper layer issues a write instruction 1005. The Peer I/O client 702 waits in the Wait-Server-Ready-Write state 1009 for the message from Peer I/O server 613. As mentioned above, the Peer I/O server 613 starts by polling the Peer I/O client 615. When the Peer I/O server 613 polls the smart card, the Peer I/O client 615 sends a status message READY-WRITExx (6Cxx) indicating that the Peer I/O client 615 is ready to transmit data where xx is the number of bytes to be sent, and stays in the Wait-Server-Ready-Write state 1009. When the Peer I/O server 613 issues a Get Packet command, the Peer I/O client 615 sends the data and moves to Wait-Upper state 1011 where it waits for upper layer instructions. If the upper layer issues "write" instruction, the Peer I/O client 615 sends status READY-WRITExx (6Cxx) to Peer I/O server 613 and moves to Wait-Server-Ready-Write state 1009. If the upper layer issues "read", the Peer I/O client 615 sends status the NO-DATA (9000) acknowledgement to Peer I/O server 613 and moves to Wait-Server-Ready-Read state 1013. When in the Wait-Server-Ready-Read state 1013, the Peer I/O client 615 waits for a command from the Peer I/O server 613. When the Peer I/O server 613 polls, the client sends another NO-DATA (9000) message and stays in Wait-Server-Ready-Read state 1013. If the Peer I/O server 613 issues a-Put Packet command, the Peer I/O client 615 gets the data and moves to the Wait-Upper state 1011.

The finite state machines 9001 and 1001 described above in conjunction with FIGS. 9 and 10 enables Peer I/O servers and clients to handle messages of any size. Because APDU limits data size to 256 bytes, one message may be sent via multiple APDUs. The protocol stack above Peer I/O on the card side manages the higher-level protocol and therefore understands the protocol and packets and, hence, can identify the beginning and the end of a frame. The Peer I/O layer does not need to know the upper layer protocol and does not know anything about the data it is forwarding back and forth between the card and the host.

8. Network Smart Card Architecture and Execution Model 8.1. Introduction

Smart cards have very limited resources in terms of CPU speed and memory size. Yet, it is desirable to be able to develop PC/workstation-like Internet applications in smart cards. The combination of these two factors presents a unique challenge to the design of the software architecture and execution model for the Internet smart card.

In a typical embedded system, because of the resource constraints, software usually runs in a single thread. The execution model is either I/O event driven or implements polling from an application running on the embedded system. The application functions are typically invoked via callback functions, which are registered by the application during initialization and are called back from the communication module. This mechanism works well for simple applications, but it cannot satisfy the requirement to be able to write PC/workstation style Internet applications.

On the other hand, modern PCs and workstations have multi-tasking operating systems. The communication system, including interrupt handler or hardware interface, device driver, and modules in the Internet protocol layer, uses more than one thread. The device driver and protocol layer typically have their own buffering schemes. Internet applications call functions of the communication system to establish connections and to send or receive data, for example, using BSD socket API. From the application's perspective, the execution model is application driven. This mechanism works well when there is enough memory resource and CPU power. However, having many threads running concurrently does not work for resource limited embedded systems because of high resource requirements and the time required for context switching between threads, especially if the RAM contents must be cached in NVM.

Both the software architecture and execution model of the network smart card 201 according to the invention fall between the typical embedded system style and typical PC style. This novel in-between mechanism enables the Internet smart card 201 to provide PC/workstation style Internet applications with the limited resources available on the smart card. Two designs are presented below, one for a single task operating system and one for a multi-tasking operating system. The two designs have similar software architecture but have different execution models.

Figure 11:
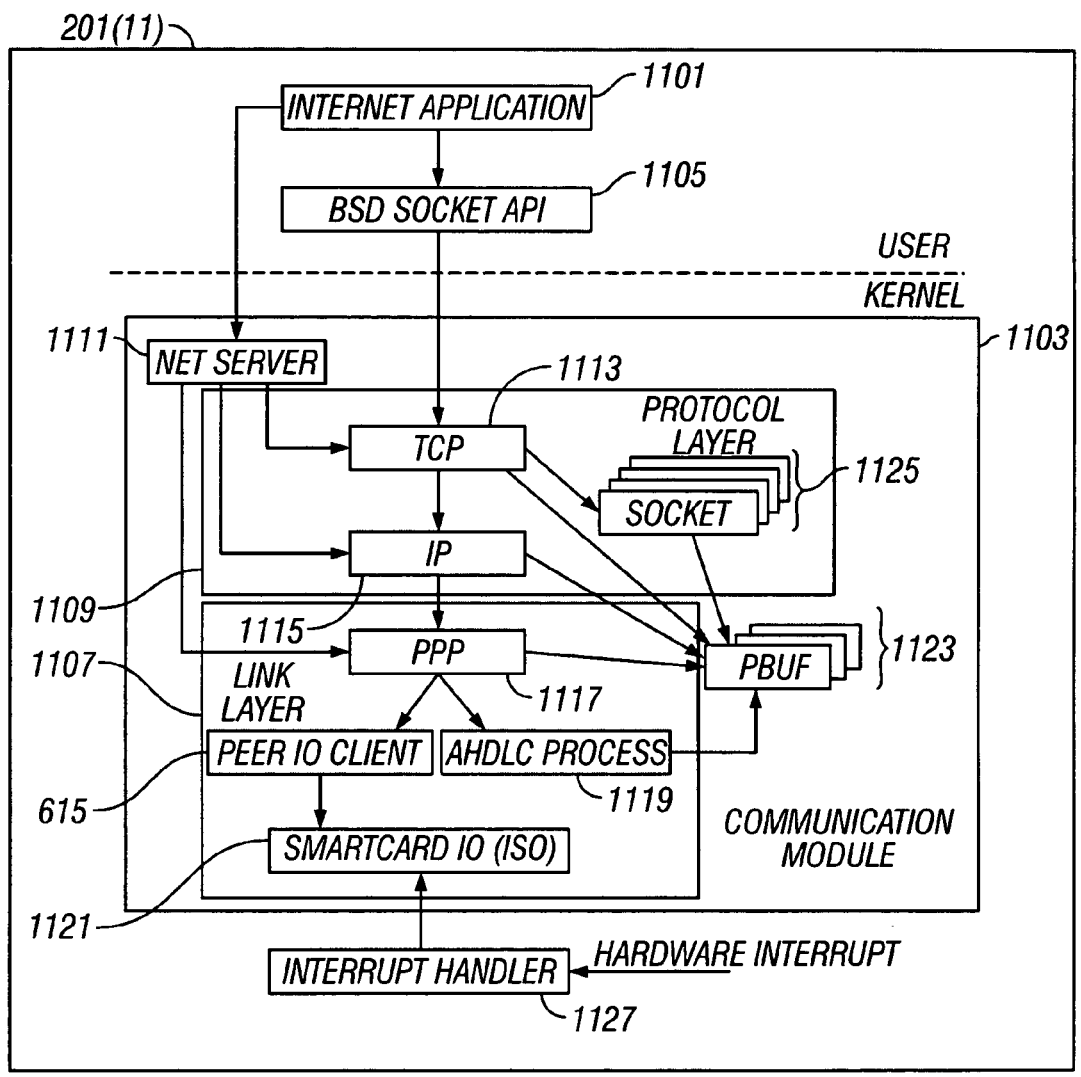
FIG. 11 is a schematic illustration of the software architecture and execution model for a network smart card according to the invention operating using a single task operating system.

FIG. 11 is a schematic illustration of the software architecture and execution model for an embodiment of the network smart card according to the invention operating using a single task operating system. In the embodiment illustrated in FIG. 11, an Internet application 1101 executes in the same thread as the communications module 1103.

Figure 12:
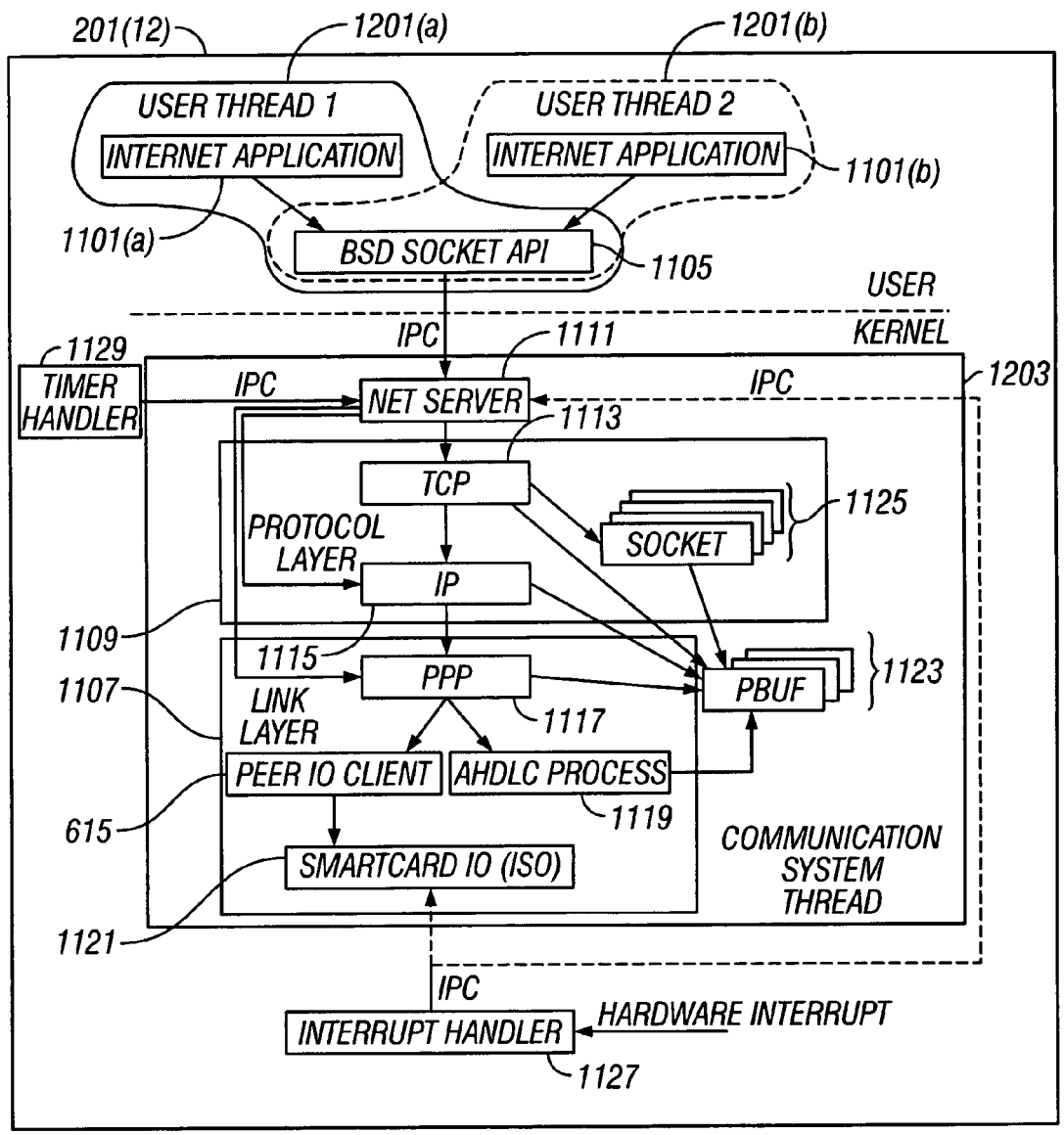
FIG. 12 is a schematic illustration of an alternative software architecture and execution model for a network smart card according to the invention operating using a multi task operating system.

FIG. 12 is a schematic illustration of an alternative software architecture and execution model for a network smart card 201 according to the invention operating using a multi task operating system. Each Internet application 1101, e.g., 1101(*a*) and (*b*), is a user process or thread. The communication module 1103 is part of the system. Because of limited resources in smart cards, in one multi-tasking operating system embodiment of the invention, the communication module uses one system thread to reduce memory usage and to avoid context switching. In both FIGS. 11 and 12 the arrows that connect between the various software modules indicate the calling hierarchy between these modules. In other words, an arrow from a Module A to a Module B indicates that Module A calls Module B or retrieves data from Module B. Thus, the arrows are not data paths, i.e., data may pass from one module to another along the direction of an arrow but may also pass in the opposite direction.

The software architecture is very similar for the single task operating system implementation of FIG. 11 and multiplitasking operating system implementation of FIG. 12. In both embodiments, the communication module 1103 (shown as communications thread 1203 in FIG. 12) is application independent. In other words, the communications layer does not require any knowledge of application specific information. To the communications module 1103, any information transmitted through it from an application to an external resource is merely data. That data may be framed according to various intermediary communications protocols such as TCP, IP, and PPP, as well as the Peer I/O protocol. However, the communications module does not require any application specific data. One advantage of so segregating the communications module 1103 from the applications 1105 is that new applications may be added without any reconfiguration of the communications module. This is a departure from previous smart card communications schemes, notably, ISO-7816, in which the communications package includes commands that are within the applications' domain, e.g., file access.

The applications 1101 access the communication module 1103 via the popular BSD socket application programmer's interface (API) 1105 for managing Internet connections and sending and receiving data. This technique satisfies the requirement for enabling PC/workstation style Internet applications. The communication module 1103 includes the link layer 1107, the protocol layer 1109, and a net server module 1111.

The communication module 1103 includes the link layer 1107 and the protocol layer 1109. The communication module 1103 also provides a net server 1111 that enables initialization of the communication module 1103 and establishment of network connection via PPP. The net server 1111, the protocol layer 1109 and the link layer 1107 interact with each other.

The protocol layer 1109 of the preferred embodiment includes a TCP module 1113 and an IP module 1115. Other modules, such as UDP, ICMP, and so on, can be added in alternative embodiments. With only TCP and IP modules, the TCP module 1113 can poll the IP module 1115 to get IP datagrams. With more TCP/IP suite modules added in, the net server 1111 may poll the IP module to get IP datagrams and demultiplexes the packets to TCP, UDP, ICMP, and so on according to the protocol type in the IP datagrams. Alternatively, for incoming data, the net server 1111 interacts with the IP module 1115, which polls PPP module 1117 and does demultiplexing according to the protocol type to TCP, UDP, ICMP, and so on. The TCP module 1113, for example, demultiplexes the data to a socket 1125 according to port number.

The link layer 1107 is dependent on the I/O hardware of the smart card 201 and the ISO standard that the smart card is using. With current standard ISO 7816 smart cards, the link layer 1107 includes a PPP module 1117, an AHDLC processing module 1119, Peer I/O client 702, and an ISO smart card I/O module 1121 (for example, a module for handling APDU). The PPP module 1117 establishes connection with the Remote Access Server (RAS) on the host PC 705 that the smart card reader is connected to. When this connection is established, RAS becomes a router for the smart card, which forwards IP datagrams transmitted between the smart card and Internet clients or servers. The PPP module 1117 packs the IP datagrams into PPP packets and unpacks PPP packets to get IP datagrams. As is described in greater detail below, the PPP module 1117 puts these IP datagrams in buffers 1123 that may be accessed by the other modules. For asynchronous physical lines, the PPP protocol uses a framing technique called asynchronous HDLC or AHDLC. The PPP module 1117 calls the AHDLC process module 1119 which forms AHDLC frames for each PPP packet for transmission. The input AHDLC frames are processed by the AHDLC module to get PPP packets. The PPP module 1117 calls upon the Peer I/O client 615 to provide a bridging function between the lower link layer protocol and network protocols. The PPP module 1117 provides the Peer I/O client 615 with PPP packets for transmission and receives PPP packets from the Peer I/O module 615 of data received from the network.

For ISO 7816 smart cards, the Peer IO protocol enables the smart card 201 to handle full duplex Internet traffic and enables the smart card 201 to be an Internet peer. The Peer I/O client module 615 executes according to the Peer I/O client finite state machine 1001 as explained in conjunction with FIG. 10. The Peer I/O client 615 sends and receives data from the network via the smart card I/O module 1121. The smart card I/O module 1121 is compliant with the ISO 7816. The 10 module 1121 sends and receives ISO 7816 APDU packets via the communications channel to the host computer 217. The payloads of APDU packets carry AHDLC frames transmitted between smart cards' link layer module 1107 and RAS on the host PC.

To reduce memory usage, the incoming data processed by the AHDLC module 1119 is put directly into a buffer chain 1123. This buffer 1123 is consumed by the PPP module 1117, the IP module 1115, and the TCP module 1113. The content of the buffer 1123 is then put onto one of several sockets 1125 by TCP demultiplexing performed by the TCP module 1113. In this manner, the link layer process 1107 shares buffers with the protocol layer 1109. In contrast, typical PC/workstation implementations have link layers and protocol layers to manage different buffering schemes. Resource management is described in greater detail below.

Hardware interrupts trigger input as well as output events. An interrupt handler 1127 manages the low level input and output. The interrupt handler 1127 actually takes bytes out of the IO hardware register for input and puts bytes into the 10 hardware register for output. The upper layer protocol sets the expected data length for the interrupt handler. For ISO 7816 smart cards, the smart card I/O module 1121 sets the expected data length.

8.2. Execution Model for Single Task Operating System

With the single task operating system, all the smart card software execute in one thread. The application 1101 calls the net server 1111 to initialize the communication module 1103 and to establish network connection via PPP. The net server 1111 calls the PPP module 1117 of the link layer module 1107 to establish the network connection via the PPP protocol. The application 1101 calls a socket API function 1105 when the application 1101 has a communication request. The socket API 1105 forwards the request to the TCP module 1113, which calls Internet Protocol (IP) functions 1115. The TCP module 1113 creates a mapping between the application 1101 and a socket 1125 based on Internet address and port numbers. Thus, the execution model is both application driven and polling. For example, to receive data from the established communication channel, the application 1101 calls the recv ( ) function of the socket API 1105. The recv ( ) calls the TCP function corresponding to the recv ( ) function. The TCP module 1113 then accesses the appropriate socket 1125 (from the mapping previously made) to retrieve data, if any, for the requesting Internet application 1101.

Even though operating in a single task operating system, the communication module 1103 can serve multiple Internet application protocols by opening multiple communication channels. For example, the communication module 1103 may serve both a web server and telnet. The Internet application 1101 calls socket API select ( ) function to get the socket that has received a message from the network. The Internet application 1101 then performs a demultiplexing operation based on the socket returned by the select( ) function to call the Internet application that owns the socket, such as web server or telnet. To enable serving multiple Internet application protocols in this manner, all the socket calls must be non-blocking.

8.3. Execution Model for Multi-Task Operating System

The execution model according to the invention for implementation of the invention in a multi-tasking operating system has a thread 1201(*a*) and 1201(*b*) for each Internet application 1101 running on the smart card 201 and a thread, the communications thread 1203, for the communications software.

With a multi-tasking operating system, the net server 1111 is the "main" function of the communication thread 1203. The net server 1111 first initializes layers of the communication module. Then, the net server 1111 establishes a PPP connection with the host computer 217 that the smart card 201 is connected to. Once connection is established, the net server 1111 enters an infinite loop that waits for events and processes the events.

The socket API 1105 interacts with the communication module 1103 via an inter-processes communication (IPC) mechanism provided by the multi-tasking OS kernel. The application 1101 calls a socket API 1105 function when the application 1101 has a communication request. The socket API 1105 forwards the request to the communication module 1103 by sending an IPC request to the net server 1111. For example, to receive data from an established communication channel, the application 1101 calls the recv ( ) function of the socket API 1105. The recv ( ) function of the socket API 1105 sends an IPC request to the net server 1111 with the request type representing the function.

Beside user processes 1101, two other system modules interact with the communication thread 1203, namely, an interrupt handler 1127 and a timer handler 1129. Hardware interrupts trigger input as well as output events. The interrupt handler 1127 manages the low level input and output. The interrupt handler 1127 sends an IPC that can be detected by the communication module 1103 when an input or an output with specified length finishes. The upper layer protocol set the expected length of data for input or output. For example, for ISO 7816 smart cards, the smart card I/O module 1121 sets the expected data length for input or output.

The communication module 1103 listens to the IPC sent by the interrupt handler 1127. There are two ways to implement this:

The smart card IO (SIO) module 1121 (for example, an APDU module) is the listener. When the SIO 1121 is listening, the communication thread 1203 blocks. This is usually not a problem since the Peer I/O client 615 only puts the smart card IO module 1121 into sending or receiving and listening mode when the smart card 201 is ready to send or receive. The Peer I/O server 613 on the host computer 217 side will send immediately after it receives the message that the smart card 201 is ready to communicate some data. For ISO 7816 smart cards, the Internet smart cards presented herein use status words as a message to indicate to the Peer I/O server 613 that the smart card 201 is ready to communicate. The advantage is that smart cards with a single task operating system can use this mechanism as well.

The net server 1111 is the listener. When the net server 1111 receives an IPC call from the I/O interrupt handler 1127, the net server 1111 calls the TCP module 1113 or IP layer 1115 to send or receive, which in turn interact with other modules. The advantage is that the communication thread 1203 does not block in order to listen to any events.

In addition to the IPC calls from applications 1101 (e.g., 1101(*a*) and 1101(*b*), via socket API 1105 and IPC calls from I/O interrupt handler 1127, the net server 1111 also listens to the timer interrupt handler 1129. This enables various protocol modules to handle different timeouts.

9. Resource Management

Memory resource, especially RAM, is scarce in smart cards. At the time of this writing, the vast majority of smart cards have less than 6K of RAM. Careful management of memory resources is therefore critical for the smart card software development. This section describes basic techniques used to put rich communication and Internet functionalities in a network smart card 201 according to the invention.

9.1. Buffer Management

The communication module 1103 of the Internet smart card 201 in one embodiment of the invention features a chained buffers mechanism to store and manage data. This chained buffers mechanism has been used in BSD style TCP/IP implementations and some embedded TCP/IP implementations (see, for example, Wright, G. R. and Stevens, W. R., *TCP/IP Illustrated*, Volume 2, Addison-Wesley Professional Computing Series, 1995; Dunkels, A. "1wIP—A Lightweight TCP/IP Stack," http://www.sics.se/~adam/1wip/; uC/IP, http://ucip.sourceforge.net/). The data structures of different kinds of chained buffers are somewhat different, but the basic mechanisms are similar. One embodiment of the invention uses Packet buffers (pbufs) defined in 1wIP in a manner to overcome the resource constraints of smart cards.

Figure 13A:
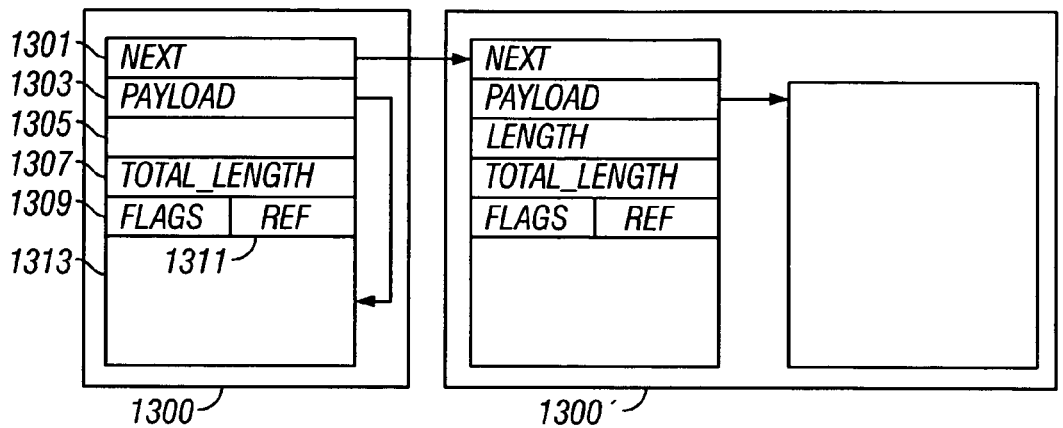
FIG. 13(a) is a schematic illustration of a pbuf chain having two pbufs.

A chained buffer mechanism defines a data structure for a buffer, which has a header portion that describes the buffer and a payload portion that contains the data. The payload portion can be in the same contiguous memory as the header portion or can be a dynamically allocated memory. FIG. 13(a) is a schematic illustration of a pbuf chain having two pbufs.

The pbuf structure 1300 consists of two pointers (next 1301 and payload 1303), two length fields (length 1305 and total_length 1307), a flags field 1309 and a reference count 1311. The next field 1301 points to the next pbuf 1300' for a pbuf chain. The payload field 1303 points to the start of data 1313 in the pbuf. The length field 1305 represents the length of data in this pbuf. The total_length field 1307 is the sum of the length of the current pbuf and all length fields of the following pbufs in the pbuf chain. The flags field 1309 indicates the type of the pbuf and ref field 1311 contains a reference count. In a preferred embodiment, the two length fields are 16 bit unsigned integers and flags and ref fields are 4 bits. The total size of the pbuf structure depends on the size of a pointer and the smallest alignment possible in the processor architecture being used. For example, for a 16-bit architecture and 1 byte alignment, the pbuf size is 9 bytes.

The buffer chain is much more flexible to use than using a fixed buffer for data I/O since each buffer can be smaller. Buffers can be chained together to provide a larger buffer. Before the protocol layer processes the data, the data length is unknown. With a fixed buffer, a large enough buffer has to be allocated to hold the input data. Such buffer allocation is a waste of memory resource if the incoming data is small. With chained buffers, a buffer can be chained as needed.

For the resource constraint smart card environment, controlling the resource usage is critical. The pbuf mechanism of 1wIP provides flexibility that allows allocating memory dynamically in addition to memory pool. The communication module 1103 uses only the memory pool mechanism that reserves a fixed pool of small pbufs. The payload size of a pbuf and the size of the pbuf pool are configurable according to the memory resource available. A typical pbuf size is 128 bytes and pbuf pool size is 4. This configuration is sufficient to establish PPP connection and provide a simple HTTP server. Using pbuf pool avoids dynamically allocating or freeing memory, which causes fragmentations of the memory space. Allocating a pbuf from the pbuf pool or freeing a pbuf to the pbuf pool are simple pointer manipulations, which are efficient and do not fragment memory.

For an incoming packet, the AHDLC processing module 1121 allocates pbufs from the pool as needed. When a byte is processed and the current pbuf is full, a new pbuf is obtained from the pbuf pool and is chained to the current pbuf. The new pbuf becomes the current pbuf. The processed byte is put into the current pbuf.

All the upper layer protocol modules, including PPP 1117, IP 1115 and TCP 1113, use the pbuf chain allocated by the AHDLC module 1119 for input processing. During PPP negotiation, the PPP module 1117 uses pbufs for both input and output. The PPP module 1117 allocates a pbuf from the pbuf pool 1123 during the output processing. A pbuf is freed to the pool 1123 as soon as the input packet is processed or the output packet is sent.

The TCP module 1113 uses pbufs somewhat differently from the PPP module 1117. During the input processing, the TCP module 1113 demultiplexes the pbuf chain allocated by the AHDLC module 1119 to the appropriate socket 1125 as the receive buffer. An application 1101 calls the socket API 1105 to establish a communications session with some external resource. As part of that initiation, a socket is allocated for the communications session. When calling the recv( ) function the application 1101 passes in the call to the recv( ) function the descriptor of the socket (one of the sockets 1125) and a reference to an application buffer. The TCP module 1113 finds the socket 1125 according to the socket descriptor passed by the application 1101 during the recv( ) function call and copies the number of bytes requested from the payload of the socket's receiving pbuf 1123 to the application buffer. The first part of the payload is the protocol headers and the rest is data. The socket keeps the receiving pbuf as long as the pbuf s payload still has unread data. The application may make multiple recv ( ) calls. The socket frees the receiving pbuf when all the data in the payload are read thereby releasing the pbuf to the pbuf pool for reuse.

Figure 13B:
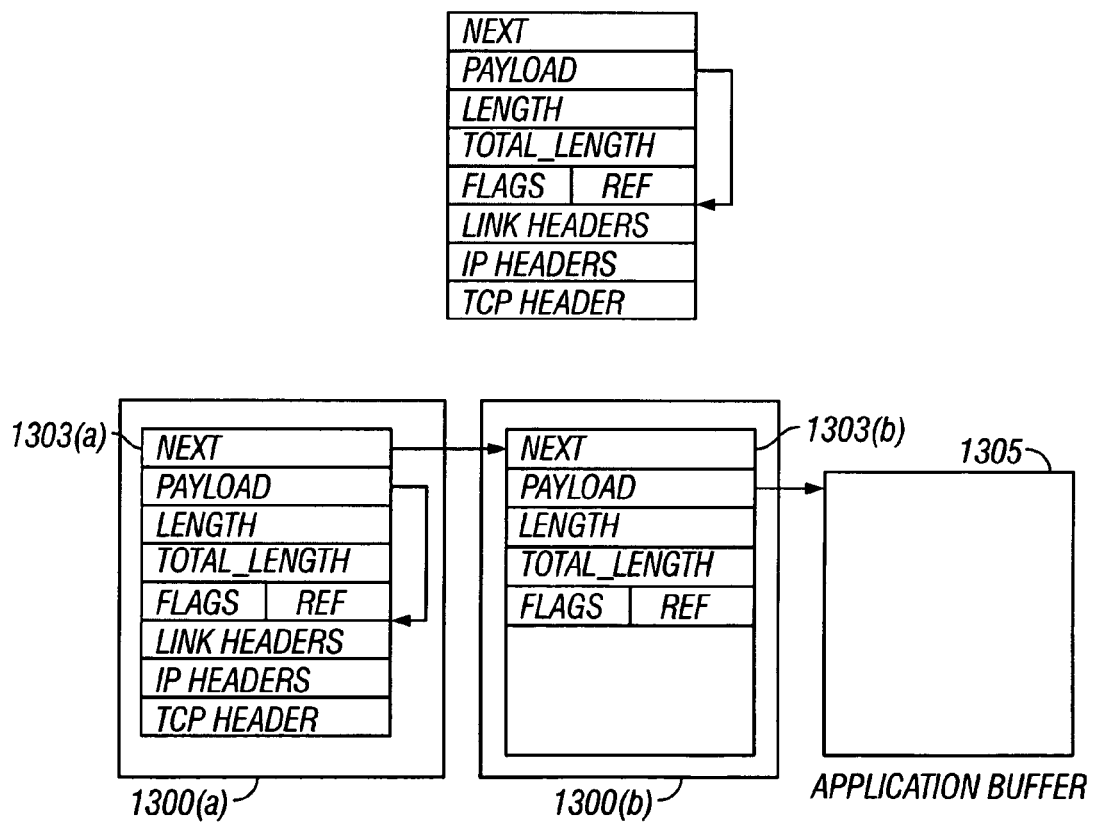
FIG. 13(b) is a schematic illustration of a pbuf chain as used in the processing of output application data.

FIG. 13(b) is a schematic illustration of a pbuf chain as used in the processing of output application data. The TCP module 1113, when processing output, uses one pbuf 1300(a) for the header. This pbuf is not from the pbuf pool mentioned above. It may come from a header pbuf pool if multiple connections are desired or be a static pbuf if sending one message at a time. The payload 1303(a) of the header pbuf points to a small array just large enough to put protocol headers. If the application 1101 has requested to send data from a socket 1125, the header pbuf 1300(a) chains with another pbuf whose payload 1303(b) points to the application buffer 1305. The pbufs are freed after the TCP packet is successfully transmitted or after a transmission attempt has failed after repeated re-transmission. Because of the resource constraints, the communication module 1103 is implemented in one thread. There is no queue between the protocol layer 1109 and the link layer 1107. A pbuf or a pbuf chain passes directly from the link layer 1107 to the protocol layer 1109 or vice versa.

9.2. Protocol Feature Subset

Because of the resource constraints, in one embodiment of the invention, only subsets of TCP, IP, and PPP are implemented. These subsets are main features of these protocols, which are necessary for the smart card presented in this paper to communicate with other Internet nodes. This section outlines the current set of features supported by the smart card. The smart card can support other protocol features with more computational resources.

PPP: The smart card supports AHDLC processing and LCP and IPCP finite state machines for PPP link layer and network layer negotiations. Dynamic IP address is supported. The LCP Asynchronous Control Character Map option and the IPCP IP-Compression Protocol option will be implemented.

IP: The smart card processes basic IP datagrams.

TCP: The smart card implements the TCP finite state machine. It supports reliable transmission, multiple connections, PUSH and delayed ACK for interactive data flow, timeout, round trip time (RTT) measurement, and retransmission time out (RTO) computation using Jacobsen's algorithm.

10. Optimizations

There are several optimization techniques that are employed on an embodiment of a network smart card according to the invention to further reduce resource usage. These techniques include in buffer AHDLC processing that reuses the buffer for AHDLC processing; transmitting with pbufs that uses pbufs as transmitting buffers; data buffer transfer that enables application use the same pbuf mechanism as the communication module; and buffer sharing with security module that has the communication and security modules share buffers.

10.1. In Buffer AHDLC Processing

The AHDLC processing module 1119 examines and processes each character for incoming frames. The AHDLC processing module 1119 finds the frame delimiters (7E) to get a frame. It finds each escape character (7D) and does an exclusive-OR between the next octet and the fixed value 20. The delimiters and escape characters are removed from the frame. Typically, the incoming data is in an input buffer and the processed data is put into another buffer. The following illustrates a typical AHDLC process for an input AHDLC frame. The frame data is a PPP LCP configuration request without any options.

Consider the two buffers in Table 1:

TABLE 1

| Input data buffer: | | | | | | | | | | | | | | | |
|---|---|---|---|---|---|---|---|---|---|---|---|---|---|---|---|
| 7E | FF | 7D | 23 | C0 | 21 | 7D | 21 | 7D | 21 | 7D | 20 | 7D | 24 | D1 | B5 | 7E |

| Output data buffer: | | | | | | | | | |
|---|---|---|---|---|---|---|---|---|---|
| FF | 03 | C0 | 21 | 01 | 01 | 00 | 04 | D1 | B5 |

Figure 14:
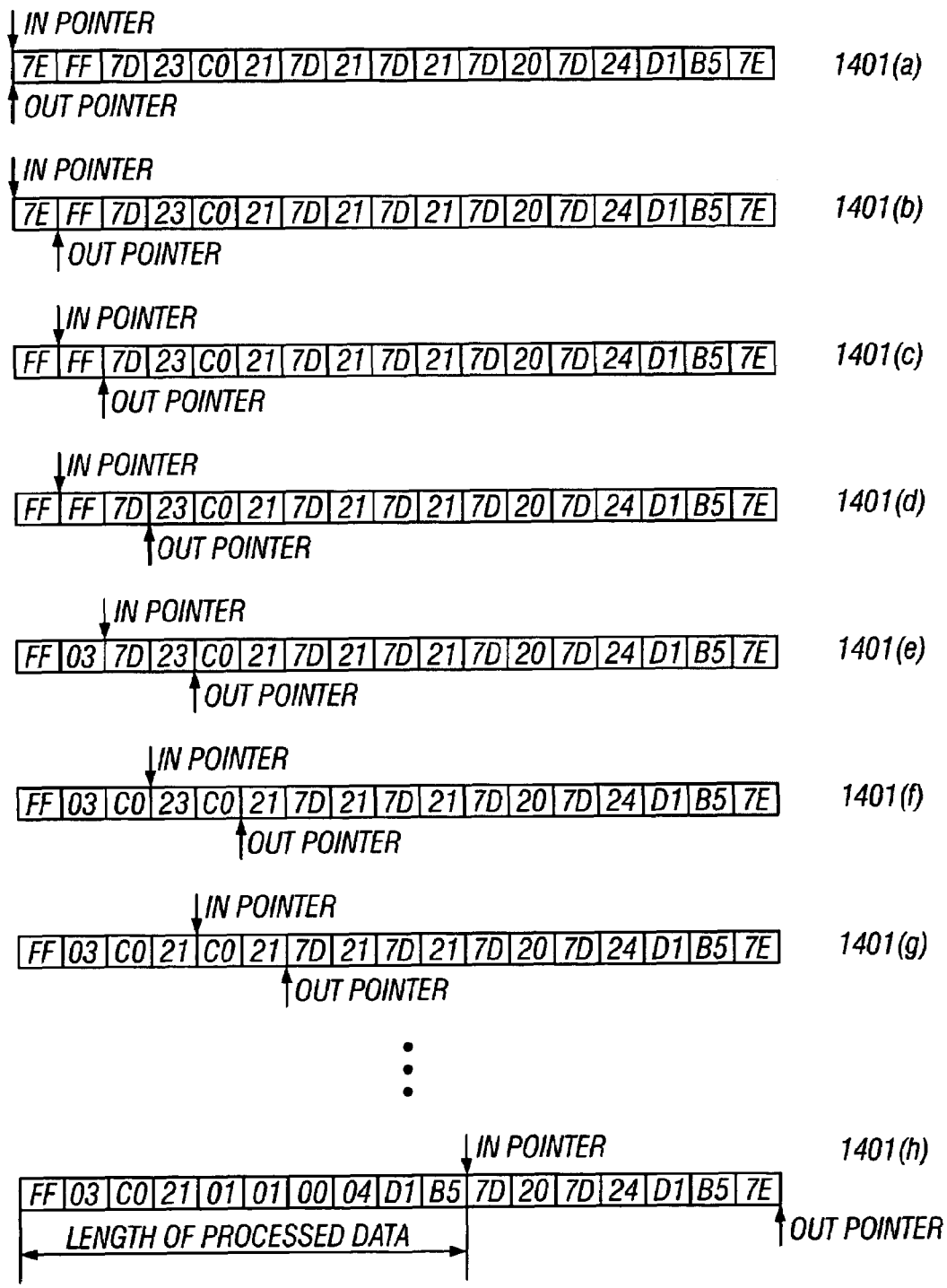
FIG. 14 is an illustration of the sequence used for in-buffer AHDLC processing.

From the AHDLC processing perspective, the only correlations between characters are the escape character (7D) and the octet after it. The delimiters and escape characters are used and removed during the AHDLC processing. The length of the processed data is always shorter than the original data. Therefore, the processed octets can be put in the same buffer as the original data. This is called the in-buffer processing. FIG. 14 shows a sequence of in-buffer processing using the above example.

Each one-dimensional array 1401(*a*) through 1401(*f*) represent the same buffer with different data. The processed data is put into the same buffer as the unprocessed data (the input data). There are two pointers. The out pointer points to the position of the octet to be processed and the in pointer points to the position that the processed octet is to be put in. Initially, both pointers point to the beginning of the buffer as shown in 1401(*a*). The first octet is 7E, which marks the beginning of a frame and does not need to be stored as processed data. Therefore, the out pointer moves on to the next octet and the in pointer remains at the same position as shown in 1401(*b*). The next octet is FF, which is part of the AHDLC header and is put to the in pointer position. Both in pointer and out pointer move to the next octets as illustrated in 1401(*c*). (Note it is not necessary to retain the AHDLC header.) The next octet is 7D, which is the escape character. The algorithm remembers it has just seen 7D but does not need to store it as processed data. Therefore, the out pointer moves to the next octet and in pointer remains at the same position as illustrated in 1401(*d*). The next octet is 23. Since the previous octet is the escape character, the algorithm performs an exclusive-OR operation of 23 with 20 with the result 03, which is stored at the in pointer position. Both in pointer and out pointer move to the next octets as illustrated in 1401(*e*). The next octet is C0, which is not escaped and is stored in the in pointer position directly. Both in pointer and out pointer move to the next octets as illustrated in 1401(*f*). The process continues until the out pointer reaches the end of the buffer 1401(*h*). The process computes the length of the processed data from the following:

Length=in pointer−beginning address of the buffer.

With in buffer AHDLC process 1119, we can put incoming data to pbufs directly at the input interrupt handler. The smart card I/O module 1121 (the APDU module for example with current smart card) allocates a pbuf when preparing for receiving. The input interrupt handler 1127 uses the pbuf directly and chains pbufs as needed. Hence the data goes from the hardware interface to application interface without any copy. This greatly saves memory resource.

10.2. Transmitting with pbufs

The I/O hardware of smart card chips does not have dedicated buffers for transmitting or receiving data. The hardware serial I/O module of the chip may only have a single register for both input and output. In the case of such smart cards, the smart card I/O layer 1121 (APDU layer in ISO case) can use pbufs directly for transmitting. The transmission routine can step over pbufs and put each byte into the hardware serial I/O register for transmission. This avoids copying from pbufs to a transmission buffer. The Peer I/O client 615 pass pbufs directly to the smart card I/O layer for output. This method reduces memory usage and enhances performance.

10.3. Data Buffer Transfer

The BSD socket interface follows traditional Unix input-output interface style, which has copy semantics. The reason for the copy is that the application and the operating system usually reside in different protection domains. For example, for a send ( ) call, the application 1101 allocates a buffer for the data and the system copies the data to a buffer of the TCP/IP stack. On a recv ( ) call, the application 1101 allocates the buffer and the system copies data from the TCP/IP stack to the application buffer. The copy requires doubling the memory requirement per packet.

In the embodiments of the invention described herein above in conjunction with FIGS. 11, 12 and 13(*a*) and (*b*), the input data is copied from the pbuf used in the communication module 1103 to the application buffer provided via socket API 1105. However, the output data is not copied to the pbuf in the communication module 1103. A pbuf header 1300(*b*) points (using payload field 1303(*b*)) to the application buffer 1305 as its payload directly for output. This saves copy time and memory. To save memory for input, the application 1101 does not allocate memory for input data and manages the pbuf passed out from the recv ( ) function. The recv( ) function remains the same as before, which is defined as the following.

int recv(int s, void *buf, size_t len, int flags);

Before the buf may be an unsigned char * and pre-allocated by the application. With the change, the buf is struct pbuf * and is not allocated by the application. The buffer is allocation by the communication module above in conjunction with FIGS. 13(*a*) and 13(*b*). The application 1101 reads from the pbuf and de-allocates the pbuf after usage. This prevents copying from pbuf to application buffer.

10.4. Buffer Sharing with Security Module

Figure 20A:
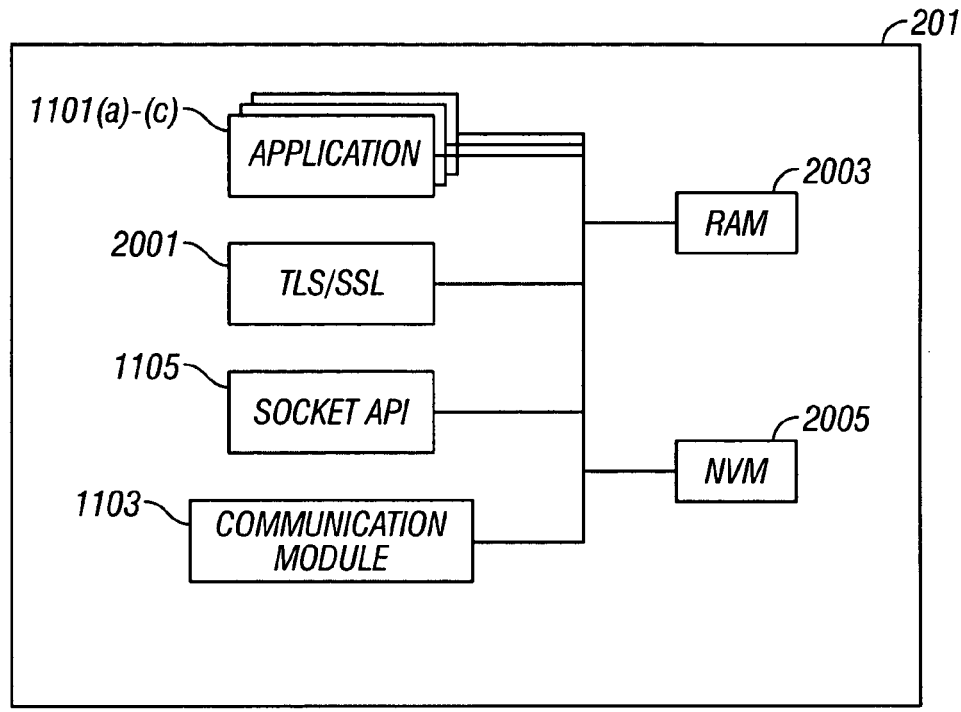
FIGS. 20(a) and (b) are schematic illustrations of the software architecture for an infrastructureless network smart card with a module for implementing the TLS protocol.

A smart card 201 implemented according to the invention may act as an independent Internet node. The card 201 also implements a security layer to ensure secure communication between the card and the remote Internet node. FIG. 20(a), described in greater detail below, is a schematic illustration of the software architecture for a network smart card with a module for implementing the TLS protocol. Implementing the security layer on the card sets the security boundary on the card, while traditionally with smart cards the security boundary is on the host computer. Having the security boundary on the card provide much better security than having the security boundary on the host or another computer in the network because having the security boundary on the card protects against security risks associated with the security of the host computer being compromised.

From the communication module 1103 perspective, the security module 2001 is part of the application. The security layer 2001 uses socket API 1105 to send or receive network data. It provides an API for its applications 1101. Using the data buffer transfer technique described above, the security module 2001 and the communication module 1103 can share pbufs instead of copying data between the two modules. This enhances performance and reduces memory usage.

11. Security

The infrastructureless network smart card 201 according to the invention, in a further embodiment, implements secure communication between the smart card and other network nodes. Returning to FIG. 1, which is an illustration of the prior art use of a smart card in a networked configuration and the security boundary thereof. A smart card 101 is inserted into a reader 107, which is connected to a host computer 109. The host computer is connected to a network 105 to which a remote computer 103 is also connected. If the network is the Internet, the communication between the remote computer 103 and the host computer 109 is via TCP/IP. The host computer 109 communicates with the smart card 101 using APDU. Furthermore, if the communication is some form of secure communication between the smart card 101 and the remote computer 103, e.g., encrypted messages, the secure communication is between the remote computer 103 and the host PC 109 and the communication between the host PC 109 and the smart card 101 may or may not be secure. Because the security boundary 111 is located on the host 109, the security of the communication is prone to attack at the host. Therefore, it would be desirable to move the security boundary from the host 109 to the smart card 101. Doing so would take the host computer out of the security scheme and attacks against it would not compromise the overall security of the communication.

Figure 15:
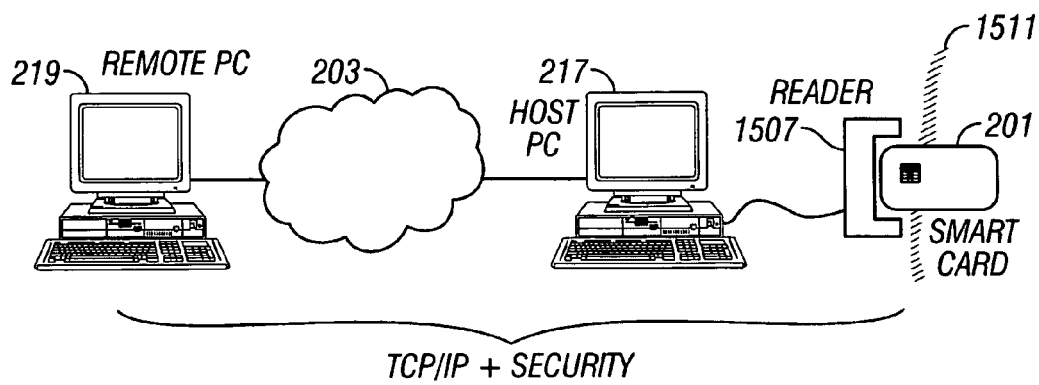
FIG. 15 is a schematic illustration of an infrastructureless network smart card according to the invention used to communicate in a secure fashion end-to-end with a remote computer wherein the security boundary is located on the smart card.

FIG. 15 is a schematic illustration of an infrastructureless network smart card 201 according to the invention used to communicate in a secure fashion end-to-end with a remote computer 219 wherein the security boundary is located on the smart card. An infrastructureless network smart card 201 according to the invention provides the secure communication mechanisms whereby the communication is secure end-to-end between the smart card and a remote PC 219, i.e., the security boundary 1511 is located on the smart card 201. The smart card may be connected to a host computer 217 as shown in FIG. 15 or via one of the other deployment schemes illustrated in FIG. 2. The smart card 201 provides communications modules (as described above) for communicating with the remote PC 219 using standard communication protocols, e.g., TCP/IP and PPP. The smart card 201 further implements necessary security mechanisms, e.g., implementation of the SSL and TLS protocols, whereby the network link to the smart card is as secure as the smart card itself.

11.1. SSL/TLS Overview

Figure 16:
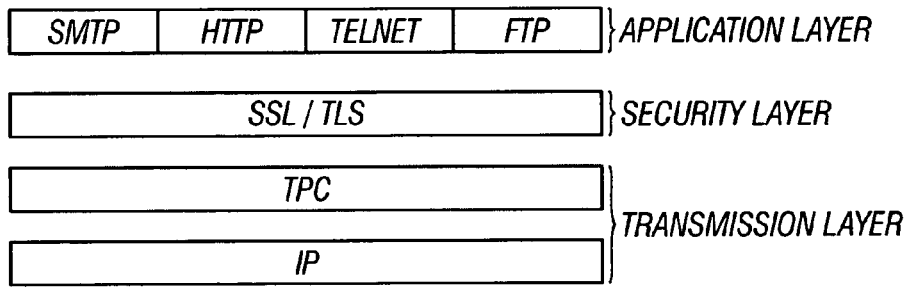
FIG. 16 is a schematic illustration of the SSL/TLS security layer relative to the application layer and transmission layers.

Nearly all secure transactions over the Internet are carried out using either Secure Socket Layer (SSL) or its successor Transport Layer Security (TLS). These protocols provide a mechanism by which data is authenticated and encrypted as it flows through the underlying network communication links. These links are considered insecure and open to attack by third parties. Instead of achieving network security by changing the underlying transmission protocol, as done by IPSec, or by modifying higher level application protocols, as done by S-HTTP, SSL/TLS adds a separate security protocol layer located between applications and underlying transmission protocols. FIG. 16 is a schematic illustration of the SSL/TLS security layer relative to the application layer and transmission layers. The Application Layer encompasses protocols such as SMTP, HTTP, Telnet and FTP. The Application Layer makes calls to the SSL/TLS layer for implementation of secure communication. The SSL/TLS layer, in turn, is above the transmission layer, e.g., TCP/IP.

As seen from FIG. 16, SSL/TLS requires a reliable, bi-directional communication layer such as TCP.

For the reader's convenience a short tutorial in SSL/TLS is provided here. More detailed information about these protocols may be found in references, such as, (Dierks, T., Allen, C., "The TLS Protocol, Version 1.0", IETF Network Working Group. RFC 2246. See http://www.ietf.org/rfc/rfc2246.txt), which is incorporated herein by reference.

11.2. Cryptography in SSL

The SSL protocol is built on top of existing cryptographic services that have been well established and are considered mathematically secure. A high level view and uses of these services are outlined in the Table 2 below.

TABLE 2

| Cryptographic Service | Use | Protects Against |
|---|---|---|
| Authentication | Prove Identity | Forgery, digital impersonation |
| Confidentiality | Keep Secret | Eavesdropping |
| Message Integrity | Verify information | Alteration during transmission |

The SSL protocol uses each of these cryptographic services to establish a secure connection between client and server systems.

Authentication is the process of identifying yourself to another party. It proves that you really are who you say you are. There is little or no value in achieving network security if you are securing your communication with the wrong party. In SSL, server side authentication is mandated by the protocol, where as client authentication is optional. Authentication is done via the use of digital certificates. SSL supports RSA and DSS algorithms. The certificates are sent in X.509 format.

Confidentiality is achieved by encrypting the data before it is sent to the other party. Encryption is done using a symmetric algorithm like DES, Triple-DES, RC4, etc. with different key lengths. Client and server generate the symmetric keys used for encryption and decryption by first exchanging a secret. This secret is exchanged using one of two public key algorithms: RSA or Diffie-Hellman.

Finally, message integrity is maintained by appending a MAC to each message. In TLS, MAC is generated using HMAC, a standard method of computing MAC values. Both MD5 and SHA-1 algorithms are used in this process.

SSL ensures that each of these three cryptographic features is maintained during an SSL session. If any cryptographic feature is found to be compromised, the SSL session is closed. For more detail on application of cryptography see, for example, the authoritative book on this subject by Bruce Schneier (Schneier, B., *Applied Cryptography, 2nd Edition*, John Wiley & Sons, New York, N.Y. (1996)).

11.3. TLS 1.0 Protocol

Transport Layer Security, TLS 1.0 is a standard protocol developed under the auspices of IETF. However, it involves relatively modest, and incremental security improvements over SSL 3.0. There is less difference between SSL 3.0 and TLS, than there is between SSL 2.0 and SSL 3.0. In fact TLS version sent in the handshake messages is 3.1, with 3 being the major version and 1 being the minor version.

Some of the main differences between SSL 3.0 and TLS 1.0 are outlined in Table 3.

TABLE 3

| Property | SSL 3.0 | TLS 1.0 |
| --- | --- | --- |
| Protocol version in handshake message | 3.0 | 3.1 |
| Types of Alert messages | 12 | 23 |
| MAC | non-standard | standard, HMAC |
| Generating key material | non-standard | standard, PRF |
| Certificate Verification | complex | simple |
| Finished message | Non-standard | standard, PRF |

The basic design of TLS has a notion of two distinct phases: handshake phase and data transfer phase. During the handshake phase, the client authenticates the server while the server can optionally authenticate the client. They both establish a set of cryptographic keys which are then used to secure the data during application phase. The handshake phase must complete successfully before application data exchange can take place.

Figure 17:
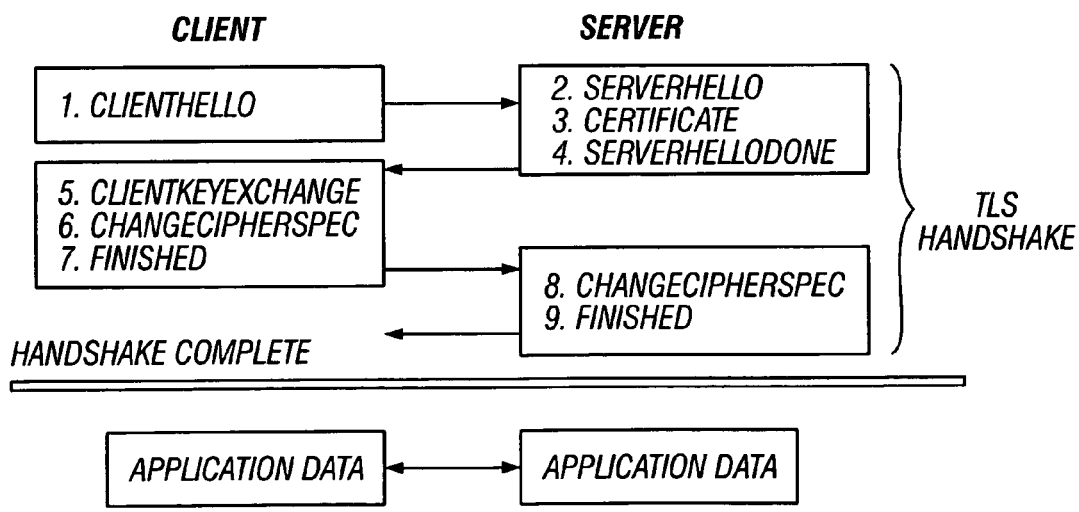
FIG. 17 is a schematic illustration of the sequence of steps that take place during a typical TLS handshake phase.

FIG. 17 is a schematic illustration of the sequence of steps that take place during a typical TLS handshake phase. The two communicating nodes have specific roles as a client or as a server.

1. ClientHello. The client side initiates a TLS handshake by sending the server a ClientHello message. The message includes the proposed protocol version, a list of cipher suites supported by the client, and a client random number that will be used in key generation process.
2. ServerHello. The server side responds with this message, which has the following information: selects the protocol version, selects the cipher suite, sends a server random number used in key generation process, and sends a session ID which can be used later by client in its ClientHello message to speedup subsequent handshakes.
3. Certificate. The server then sends its public key certificate in a Certificate message. This allows the client side to authenticate the server, and also to get its public key.
4. ServerHelloDone. The server then sends this message to indicate to the client that the latter should go ahead with its validation of the information just sent to it.
5. ClientKeyExchange. The client sends the server this message to begin the process of key exchange. This message has a pre-master-secret that has been encrypted using the public key of the server. The server public key was sent in the Certificate message. The server side decrypts the pre-master-secret using its private key. At this point both the client and the server have all the data they need to generate a set of session keys. This is done by using a pseudo random function (PRF) as defined in TLS 1.0 Specification. There are three inputs to this PRF: client random number, server random number, and pre-master-secret.
6. ChangeCipherSpec. Client sends this message to indicate that it is ready to send data using agreed upon cipher suite and keys.
7. ClientFinished. The client then sends this message to indicate that it is done with handshake. This message uses the cryptographic algorithm and keys selected in this handshake to encrypt the data. The message itself consists of a hash of all the handshake messages exchanged so far.
8. ChangeCipherSpec. The server also sends this message to indicate that it is ready to send messages using the agreed upon cipher suite and keys.
9. ServerFinish. Finally the server sends a corresponding Finish message to client. This message is encrypted using the selected cipher suite, and carries a similar hash of all handshake messages exchanged so far.

Figure 18:
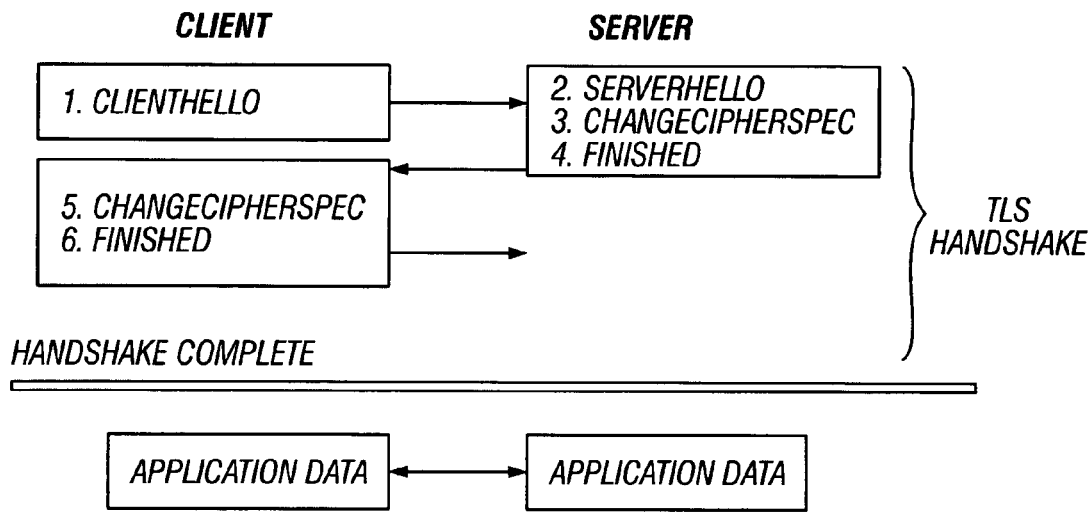
FIG. 18 is a schematic illustration of the sequence of steps that take place during a partial TLS handshake phase.

FIG. 18 is an illustration of a partial TLS handshake message sequence during session resumption. As with the handshake sequence described in conjunction with FIG. 17, the two communicating nodes have specific roles as a client or as a server.

FIG. 18 is a schematic illustration of the sequence of steps that take place during a typical partial TLS handshake phase. As with full TLS handshake described in FIG. 17, the two communicating nodes have specific roles as a client or as a server. A partial handshake is needed when resuming a previously established session.

1. ClientHello. The client side initiates a partial TLS handshake by sending the server a ClientHello message. The ClientHello message includes the session ID from a previous session as well as a new client random number that will be used in key generation process.
2. ServerHello. The server side responds with this message. It either agrees to reuse the session ID passed in step 1 above, or rejects it. If the session ID is rejected, client has to re-initiate a new full TLS handshake as described in FIG. 17. If the session ID is accepted, the process continues with the partial handshake.
3. ChangeCipherSpec. If the session ID is accepted, the server recomputes key material using the new client random value passed in step 1, and the pre-master-secret from a previous session. The session ID to use is transmitted with the ClientHello message in step 1. FIG. 17, step 5 describes how this pre-master-secret was shared between client and server in a full TLS handshake. Once the new key material is computed, the server sends ChangeCipherSpec message to client to indicate that it will now start using the new keys.
4. Finished. The server then sends a Finish message to indicate to the client that the client should go ahead with its validation of the newly activated key options.
5. ChangeCipherSpec. The client sends the server a ChangeCipherSpec message to indicate that the client has validated the new key options, and that it will use them for all future message exchanges.
6. Finish. The client then sends the server a Finish message to indicate that the client has completed its part of the handshake.

After concluding these steps, the two sides can exchange application data using newly established keys.

Figure 19:
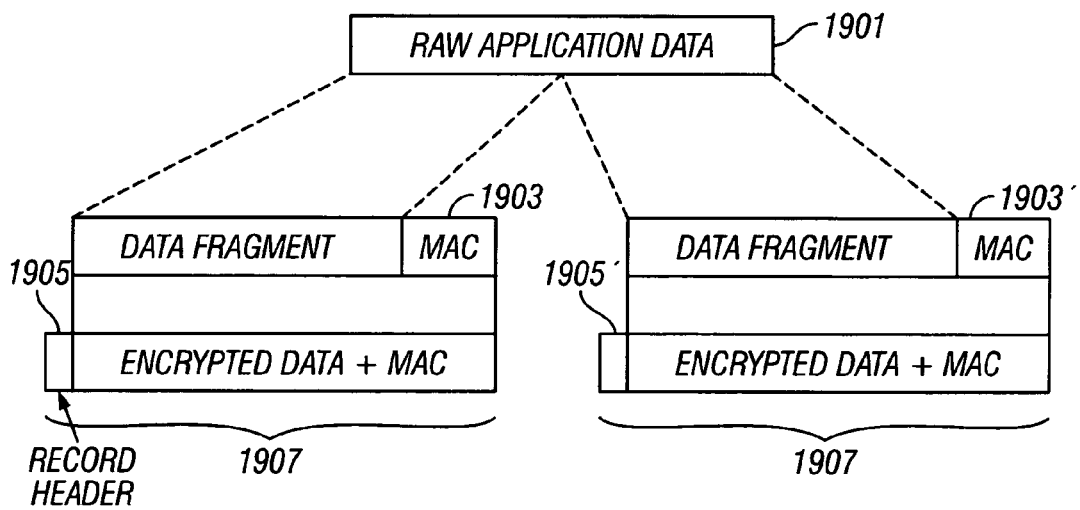
FIG. 19 is an illustration of the TLS Record Protocol.

There are two advantages to using TLS session resumption. Both are particularly significant when using TLS in a resource constrained device such as a smart card. Firstly, the number of messages exchanged in session resumption handshake phase is less than the corresponding number in full TLS handshake. This translates into fewer communication round trip connections to the smart card, and therefore improves data throughput. Secondly, since session resumption handshake is reusing the pre-master-secret from a previous session, we do not need to perform decryption using the server's private key. Such decryptions, as needed when using the RSA algorithm, can be computationally intensive and have a tendency of not only delaying communication response time, but also stretch the limited RAM resource of a smart card. Performing a session resumption handshake can make such RSA computations less frequent. FIG. 19 is an illustration of the TLS Record Protocol. Once the handshake phase completes successfully, each node can send application data to the other. During the application data transfer phase raw data 1901 is divided into segments. A MAC is appended to each segment 1903 and 1903', and the resulting record is encrypted using the keys and algorithms established during handshake as described in conjunction with FIG. 17. A header 1905 and 1905' is then attached to this record and sent using the underlying TCP layer.

The encrypted payload, consisting of data and MAC, and the unencrypted header are collectively referred to as TLS record 1907 and 1907'. It is the TLS record 1907 (and 1907') that is actually transmitted. The header contains information about the size of record.

11.4. Security of SSL and TLS

SSL have been in widespread use for almost a decade now. These protocols are ubiquitous in its application to secure web-based transactions. Although several flaws and shortcoming were found in SSL 2.0 protocol, SSL 3.0 was redesigned to correct these security flaws. TLS has further enhanced the protocol security. Several detailed studies have been done to analyze the security and robustness of SSL and no major flaws have been discovered. There have been various flaws reported in specific implementations of SSL and TLS, but not in the protocol itself. As such, SSL and TLS are considered valuable contributions towards practical network communication security and are therefore desirable to implement in infrastructureless network smart cards.

12. Design of TLS for Smart Card

Transport Layer Security protocol, even when implemented on enterprise systems with abundant system resources, adds a considerable overhead in terms of performance as well as computational requirements. This is particularly true during the initial handshake phase of TLS protocol when both client and server are engaged in a flurry of activity. This activity consists of authenticating each other, selecting a cipher suite, and finally computing various session keys. To achieve this on the server side while using an infrastructureless network smart card, the infrastructureless network smart card according to the invention includes an implementation of the TLS protocol stack and various cryptographic services.

On a resource constrained device like smart card, the effects of the overhead associated with authentication, selecting cipher suite, and computing session keys imposes a large performance burden on the resource constrained device. The biggest challenge is conservation of RAM, an extremely scarce resource on smart cards as well as on other resource-constrained devices. In one embodiment of the invention, with these optimizations the combined RAM footprint of TLS protocol and cryptographic layer is only 1.5 kilobytes.

The infrastructureless network smart card TLS server side implementation allows the smart card to act as a secure web server using HTTPS protocol.

12.1. Protocol Feature Subset

Due to the limited resources on resource-constrained devices, the first challenge is the selection of a minimal feature set from SSL/TLS protocol specification without compromising either the TLS specification or the compatibility with existing standard clients, the main stream web browsers. The preferred embodiment of the invention has been tested successfully with three browsers, Internet Explorer, Netscape, and Mozilla.

Most SSL Server implementations tend to support all three protocol flavors of SSL: SSL 2.0, SSL 3.0, and TLS 1.0. A preferred embodiment of the invention includes solely an implementation of the TLS 1.0 specification. Because all major browsers (e.g., Internet Explorer 6.0 and Netscape 7.0) support TLS, and because the TLS protocol is more secure than its predecessor protocols, it is sufficient to implement only TLS. However, alternative embodiments include supporting SSL 2.0 and SSL 3.0 in the same implementation. Furthermore, the techniques herein are applicable to future versions of TLS.

Figure 20B:
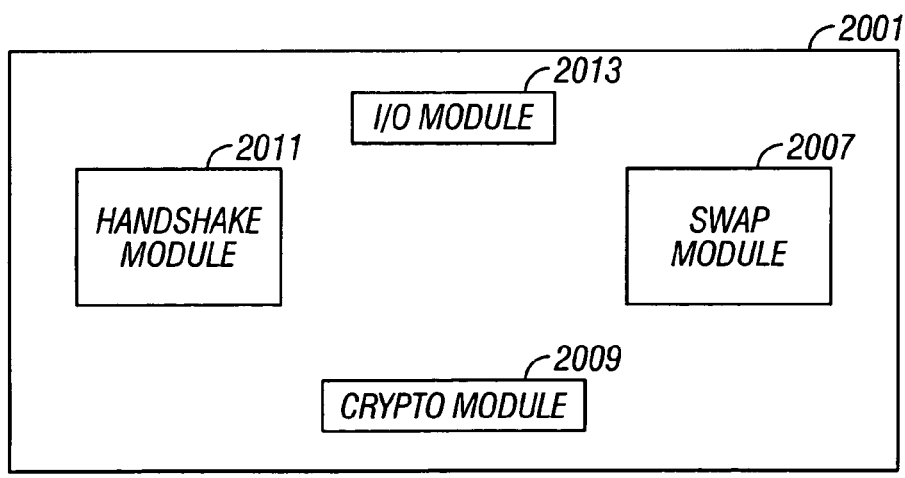

FIG. 20(*a*) is a schematic illustration of the software architecture for an infrastructureless network smart card 201 with a module 2001 for implementing the TLS protocol. An Internet application 1101 interacts with the TLS module 2001, which, in turn, obtains communications services through the communications system 1103 (described in greater detail above) via the socket API module 1105. The TLS module has direct access to RAM 2003 and NVM 2005 to take advantage of optimization techniques described herein below.

FIG. 20(*b*) is a further schematic illustration of the modules that make up the TLS module 2001. The TLS module 2001 includes a swap module 2007 (described in greater detail below), a crypto module 2009 for performing cryptographic services, a handshake module 2011 for performing the handshake functionality described above in conjunction with FIGS. 17 and 18, and an I/O module 2013 which provides input and output services between the TLS module and other components on the resource-constrained device.

In the preferred embodiment implementation of TLS 1.0 protocol on an infrastructureless network smart card 201, compatibility with Netscape browsers required that the implementation at least support SSL 2.0 Client-hello. This implementation requirement is because Netscape 7.0 browser sends its first handshake message, Client-hello, in SSL 2.0 format, even if TLS is selected as the highest protocol available on the browser. Accordingly, if future standard web browsers uniformly do not include the limitation that Client-hello is carried out in the fashion of SSL 2.0, it would be possible to implement TLS on an infrastructureless network smart card 201 without that feature.

The record format for SSL 2.0 and TLS 1.0 is completely different. The approach of sending the first handshake message in SSL 2.0 record format allows an old server implementation, that only support SSL 2.0 protocol, to downgrade to SSL 2.0. However, for new server implementations it adds the extra responsibility to being able to at least read the Client-hello message in SSL 2.0 record format, even if the server implementation does not support SSL 2.0 protocol.

An infrastructureless network smart card may be implemented using any one of several cipher suites supported by TLS. The TLS 1.0 specification defines 32 cipher suites. Each cipher suite is a combination of four cryptographic algorithms, one for each of the following operations: authentication, key exchange, symmetric encryption, and message digest. In a preferred embodiment of the infrastructureless network smart card there is no support for all 32 cipher suites. According to TLS 1.0 specification the decision of which cipher suite to use during a TLS session rests with the server side. One embodiment of the invention uses the TLS_RSA_WITH_DES_CBC_SHA cipher suite for two reasons. Firstly, it is available on all major browsers. Secondly, hardware support for RSA and DES algorithms is quite common on smart cards. This cipher suite uses RSA for both authentication and key exchange. It uses DES for symmetric encryption and SHA1 as digest algorithm. Although SHA1 is used as digest algorithm, TLS 1.0 specification requires that we also support HMAC with both MD5 and SHA1. Current smart card chips also have support for AES but TLS 1.0 specification does not define any cipher suites with AES as symmetric encryption algorithm.

As such, the feature subset for the server side implementation is TLS 1.0 specification, along with the ability to understand SSL 2.0 Client-hello message. TLS_RSA_WITH_DES_CBC_SHA is the supported cipher suite is, as defined in TLS 1.0 specification.

12.2. Use of Stack and Heap

RAM is a critical resource on smart cards and on other resource-constrained devices. One of the approaches to reducing RAM usage is to cut down on the process stack size required to support TLS layer. A preferred embodiment of the invention uses a customized heap management sub-system so that buffers can be dynamically allocated and de-allocated as needed. All memory required for maintaining TLS context state and for performing cryptographic operations is allocated dynamically on the heap. There are very few local variables in functions, and the call stack depth is intentionally kept as low as possible. This allows the TLS layer to use no more than 200 bytes of stack space. The heap space for the TLS layer is fixed and allocated at start up time from a RAM pool. The TLS server implementation requests buffers from this heap on an as needed basis and then frees them once the task is complete. The same RAM space can then be used for other operations. Since the TLS state machine knows exactly when it is safe to free a buffer, pre-mature and accidental buffer release is not an issue.

12.3. Buffer Reuse

As an additional optimization of dynamic heap management, the same allocated buffer can be used in more than one context without being freed. This saves the overhead of de-allocating and then allocation the buffer from the RAM pool again. However, this kind of optimization has to be done extremely carefully. In one embodiment of the invention, in the TLS server implementation 2001 buffer reuse is employed in a number of places. Examples of this approach are the following:

During the full handshake phase, pre-master secret and the master secret use a single common buffer. Although both values are critical during the handshake, they are not used at the same time. Once master secret has been computed from pre-master secret the latter can be discarded. This property allows us to use the same buffer to hold two values at different times.

While processing Client-key-exchange message, the value of encrypted pre-master secret is not copied to a separate buffer. Instead it is kept in the same global read buffer used for reading all incoming TLS records. The $6^{th}$ byte of this buffer is the starting point of encrypted pre-master secret. The length of this encrypted data is same as RSA key size, namely, 128 bytes for a 1024-bit RSA key. The subsequent RSA decryption operation is performed by treating $6^{th}$ byte of read buffer as the start of cipher text input data. A preferred embodiment includes logic to ensure that the data in the read buffer is not modified until RSA decryption is complete.

When performing DES encryption and decryption the same buffer is used for input as well as output. DES operations in CBC mode are performed on 8-byte block boundaries. Once the input data is used for an 8-byte computation it is not needed again for subsequent computations. As such it is safe to store the output value in the same buffer. This eliminates the overhead of having to allocate an additional buffer for DES.

12.4. Swapping of Context to NVM

While buffer reuse technique reduces the RAM footprint in some cases, it does not cover all scenarios. There are times during the handshake process when a lot more information needs to be kept in memory than the allocated RAM pool will allow. In these situations a preferred embodiment swaps unused data from RAM to non-volatile memory (NVM) of the smart card. NVM is much more abundant than RAM on a smart card. The RAM buffer is reassigned to hold some other data and perform a different set of computations. Once this set of computations is complete, the saved data is reloaded from NVM and RAM context is restored to its original state.

FIG. 21 is an illustration of swapping a data block from the RAM pool to NVM.

Swapping data from NVM to RAM may appear to be an all-encompassing solution that can eliminate all problems associated with limited RAM. However, its use needs to be studied carefully and applied in a calculated manner. There are two reasons for this.

Firstly, the TLS module 2001 identifies blocks of data that are large enough to justify the overhead of swapping, but are disjoint enough so that they do not need to be in RAM concurrently. Secondly, swapping to NVM is a performance critical operation. While reading from NVM may take the same amount of time as reading from RAM, writing to it is much slower. As such swapping to NVM should be used in only those situations that justify this overhead.

FIG. 21 illustrates the process of swapping to NVM performed by the TLS module 2001, particularly, in one embodiment, the swap module 2007. There are four stages during the swap process, each indicated by letters 'a' to 'd'.

a) This is the initial stage. A buffer area, indicated by the crosshatched rectangle 2101 in RAM area 2003 being used for some computation. Once the computation reaches a steady state this buffer 2101 can be swapped out. The steady state in this case when the smart card is not using RAM for any data processing, but will need the data currently in RAM at a later stage.

b) In this stage the data stored in RAM buffer 2101 has been written to NVM as NVM buffer 2103. The same area in RAM, i.e., RAM buffer 2101 is free for use by some other computation. As pointed out herein above, writing to NVM is a costly operation. This accounts for the performance overhead associated with swapping data in RAM buffers into NVM.

c) In this stage the TLS module 2001 or another module of the infrastructureless network smart card 2001 has added some new data in the RAM buffer 2101 as indicated by the crosshatch. It is being used for some other computations. Note that the data from the original RAM buffer 2101 is still in NVM 2005 in buffer 2103.

d) The computations of stage 'c' are complete and the swap module 2007 has reloaded our original RAM buffer 2101 from NVM. The original context has been restored. Note that stage 'd' is identical to stage 'a'.

In the preferred embodiment TLS 1.0 server side implementation 2001, swapping to NVM is done while decrypting pre-master secret using RSA private key. The decision to swap at this stage of TLS handshake meets the above identified criteria for buffer swapping. During decrypting pre-master secret, two distinct buffers that are vying for RAM 2003 resources, but they do not need to use the RAM 2003 simultaneously. These two buffers are the TLS context buffer which holds information about the state of TLS handshake, and the RSA buffer which decrypts pre-master secret sent by the client. While the TLS module 2001 is performing RSA decryption it can safely swap TLS context buffer to NVM. The overhead of swapping to NVM is justified at the pre-master secret decryption stage for three main reasons:

First, both the TLS context buffer and RSA buffer use considerable RAM, and not using the swapping approach would increase the RAM requirement by 546 bytes. See Table 4 for a detailed description of what fields of TLS context need to be swapped.

Second, RSA decryption is done only during a full handshake. This happens when a client browser connects to our TLS server for the first time. For example when a new browser instance is launched and we connect to a secure web server. After that we use partial handshake where the master secret is reused to generate a new set of session keys. Since a new master secret is not exchanged between client and server, there is no need to perform a costly RSA decryption.

Finally, RSA decryption by itself is computationally intensive, requiring considerable time. The time spent in swapping the RAM buffer to NVM is only a fraction of the time it takes to perform RSA decryption. This is particularly true of devices that do not have a fast hardware cryptographic accelerator. Therefore, the overhead of NVM swap is not that noticeable.

Table 4 outlines the information in the TLS context that needs to be swapped to NVM (all sizes are in bytes):

TABLE 4

| Field Name | Size | Description |
| --- | --- | --- |
| socket | 4 | Underlying communication socket used for I/O of TLS records |
| client | 1 | Client browser we are talking to, e.g. IE, Netscape, etc. |
| hs.state | 1 | Next handshake state |
| hs.verifyData | 20 | Verify Data buffer. This holds the MAC of all handshake messages |
| keyGen.cRandom | 32 | Random value sent by client, used in key generation process |
| keyGen.sRandom | 32 | Random value sent by server, used in key generation process |
| tlsMD5Ctx | 88 | MD5 context for computing a rolling HMAC of handshake messages |
| tlsSHACtx | 92 | SHA1 context for computing a rolling HMAC of handshake messages |
| cSequence | 2 | Client sequence number |
| sSequence | 2 | Server sequence number |
| buffer | 200 | Last TLS record buffer read before swapping the context |
| key | 72 | Key material for current session |

12.5. MAC Computation during Handshake

TLS 1.0 specification requires that both client and server maintain a hashed MAC of all messages they exchange during their handshake phase. This helps prevent man-in-the-middle attacks on TLS protocol. Some implementations of TLS concatenate all handshake messages in a dedicated global buffer and then use it to generate the MAC. On a resource constrained device such as a smart card, limitation of available RAM and the performance overhead of writing to NVM, make concatenation of all messages in a large buffer an impractical solution.

In one embodiment of the invention the TLS module 2001 maintains a rolling hashed MAC of all handshake messages. Each incoming handshake message is added to the MAC, and so is each outgoing message. The TLS module 2001 maintains two hash contexts, one for doing MAC using MD5, and the other for doing MAC using SHA1. To digest a message, the TLS module 2001 calls a hashing update ( ) function on both these contexts. As the last message is sent or received the TLS module 2001 calls the final ( ) hashing function on each of the two contexts and then use the resulting hash values of 16 bytes for MD5 and 20 bytes for SHA digest in pseudo random function (PRF) to get a 12 byte Finish Data. The details of PRF are part of TLS 1.0 specification. This 12-byte value is then compared with the value computed by client to make sure that handshake negotiation did not suffer from a man-in-the-middle attack.

However, because of the sequence of handshake messages while computing Client Finish data in a full handshake, and Server Finish data in a partial handshake, the TLS module 2001 performs one additional task to maintain a rolling MAC during handshake. During a full handshake, when a client sends its Client Finish message it has completed the handshake from the client side. As such it send the "finish" data as part of this message. On the server side, in order to verify this "finish" data the TLS module 2001 calls final ( ) on both hash contexts (MD5 and SHA1) and then uses PRF to obtain the 12-byte "finish" data. However, the TLS module 2001 also sends one more handshake message, Server Finish, which needs to be digested in the MAC. The problem is that once the TLS module calls final ( ) on a hash context it cannot use it to digest any more messages. The same problem arises during partial handshake. This time the TLS module 2001 sends Server Finish message before receiving Client Finish message.

To solve this problem the TLS module 2001 contains logic to perform a combination of buffer swapping techniques. When computing Client Finish message during full handshake the TLS module carries out the following steps:

Save MD5 context to NVM.
Call final ( ) on the MD5 context to get 16-byte final hash value.
Restore MD5 context from NVM.
Save SHA1 context to NVM.
Call final ( ) on the SHA1 context to get 20-byte final hash value.
Restore SHA1 context from NVM.
Use the MD5 hash and SHA1 hash values to compute 12-byte client finish data.
Compare this data against the value received in Client Finish message.

When computing Server Finish message during partial handshake the TLS module carries out the following steps:

Save MD5 context to a swap buffer in RAM.
Call final ( ) on MD5 context to get 16-byte hash value.
Restore MD5 context from temporary swap buffer in RAM.
Save SHA1 buffer to the same temporary swap buffer in RAM.
Call final ( ) on SHA1 context to get 20-byte hash value.
Restore SHA1 context from swap buffer in RAM.
Use MD5 and SHA1 hash values to generate 12-byte server finish data. Send this to client in Server Finish message.

In the Server Finish case of partial handshake, the TLS module 2001 uses a temporary swap buffer in RAM 2003 instead of swapping to NVM 2005. This is because RAM overhead of partial handshake is less than that of a full handshake. The TLS module 2001 therefore has some RAM buffers that are available during partial handshake that are not available during a full handshake. Moreover, partial handshake happens much more often than a full handshake. To avoid the performance overhead of writing to NVM the TLS does not do so for partial handshake.

12.6. Application Data I/O

Once TLS handshake is complete, the TLS module 2001 establishes a set of session keys, which can be used to encrypt and decrypt application data. Client and server can now begin to exchange data in a secure manner. On the server side of TLS implementation, receiving data from client presents a unique challenge on resource-constrained devices like smart cards. The issue is size of receive buffer in which TLS record is read from underlying socket.

Figure 22:
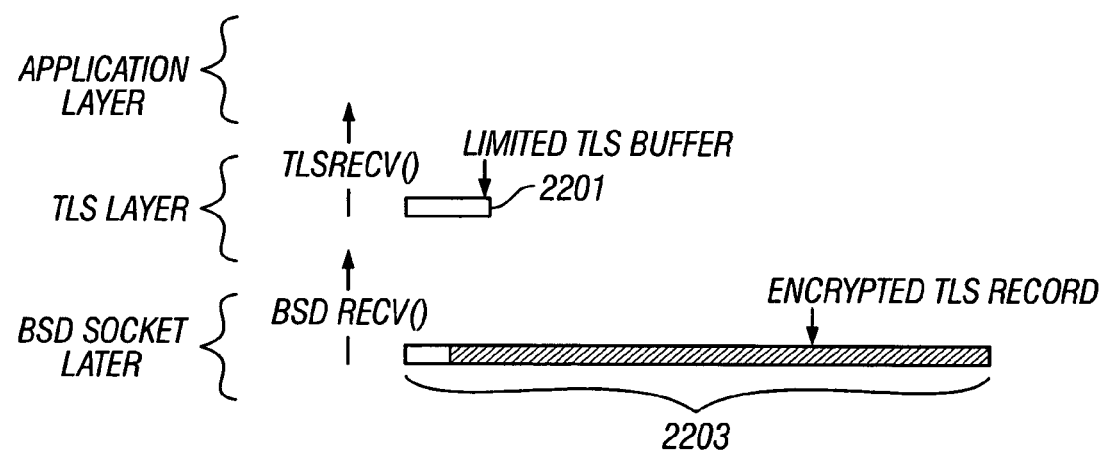
FIG. 22 is an illustration of the process of reading a TLS record that is larger than the buffer available on a resource-constrained device for TLS records.

FIG. 22 is an illustration of the process of reading a TLS record that is larger than the buffer available on a resource-constrained device for TLS records.

To reduce RAM footprint the TLS receive buffer 2201 is limited to 200 bytes. However, some clients implementing the TLS protocol send TLS records 2203 with much larger sizes. For example, IE and Netscape browsers will send a complete GET request in a single encrypted TLS record. The size of such a record can be on the order of 500 bytes. Since symmetric encryption and MAC are applied to the complete record, the challenge on resource constrained devices is to use a 200-byte TLS context receive buffer to read TLS records of larger sizes. Reading a TLS record involves decryption as well are verification of MAC.

This problem may be solved by either of two distinct approaches that are described herein below.

Performance Critical Approach

Error Critical Approach

In performance critical approach, an application can request that TLS I/O module 2013 make data available to the application as soon as data is read. At this point the TLS record may not have been read completely and, therefore, the MAC over entire TLS record may not have been verified. The application, however, accepts the delayed notification of MAC verification to get faster access to data. In the Error Critical approach, the application can request that no data should be passed to it until MAC integrity has been verified over the entire TLS record. This is a safer application interface, but the application has to wait until the TLS record has been processed before data is passed to it. The TLS I/O module 2013 supports both these approaches. Any application can pick either one to suite its needs.

Figure 23:
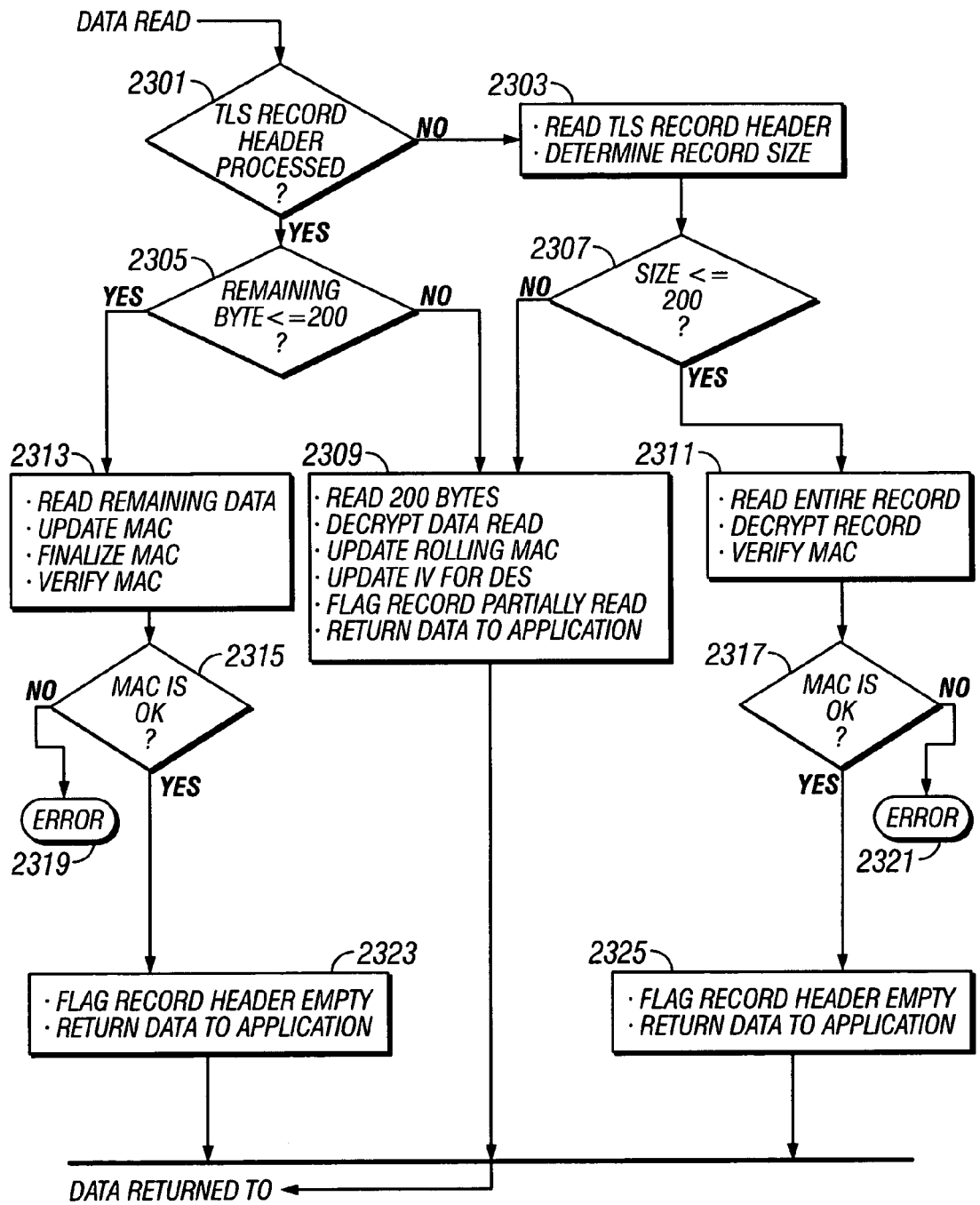
FIG. 23 is an illustration of a first approach to reading large TLS records while using a small TLS buffer, which is called the performance-critical approach.

FIG. 23 is an illustration of the first approach to reading large TLS records while using a small TLS buffer, which is called the performance-critical approach. In the performance-critical approach the TLS I/O Module 2013 reads the TLS record in blocks of 200 (or less) bytes. First the TLS I/O Module 2013 determines if the TLS Record header has been processed by a previous iteration through the TLS record, step 2301. If the Record header has not been processed, it is read and the record size is determined, step 2303.

Either way, if the remaining number of bytes or the record size is not less than or equal to the size of the TLS buffer 2201, e.g., 200 bytes, steps 2305 and 2307, respectively, the number of bytes that will fit in the TLS buffer 2201 (e.g., 200 bytes) are read and the record is flagged as partially read, step 2309. Otherwise, the entire record, step 2311, or the remaining data, step 2313, is read.

After each read, the incoming data is decrypted, MAC context is updated, initialization vector is updated, and plain text data is returned to the application, steps 2313, 2309, and 2311.

When the final block of data is read from TLS record, the TLS module 2001 performs an additional step of verifying the MAC over the complete TLS record, steps 2315, 2317. If the MAC fails an error is flagged, step 2319, 2321. In this approach the application layer obtains data as soon as the data is read without having to pay the penalty of larger RAM buffers. However, since MAC verification is not possible until the entire TLS record has been read, any errors in secure transmission are not flagged until we read the entire record steps 2323, 2325. In most applications this slight delay in receiving a transmission error is acceptable, particularly if the application request this behavior to improve performance.

Figure 24:
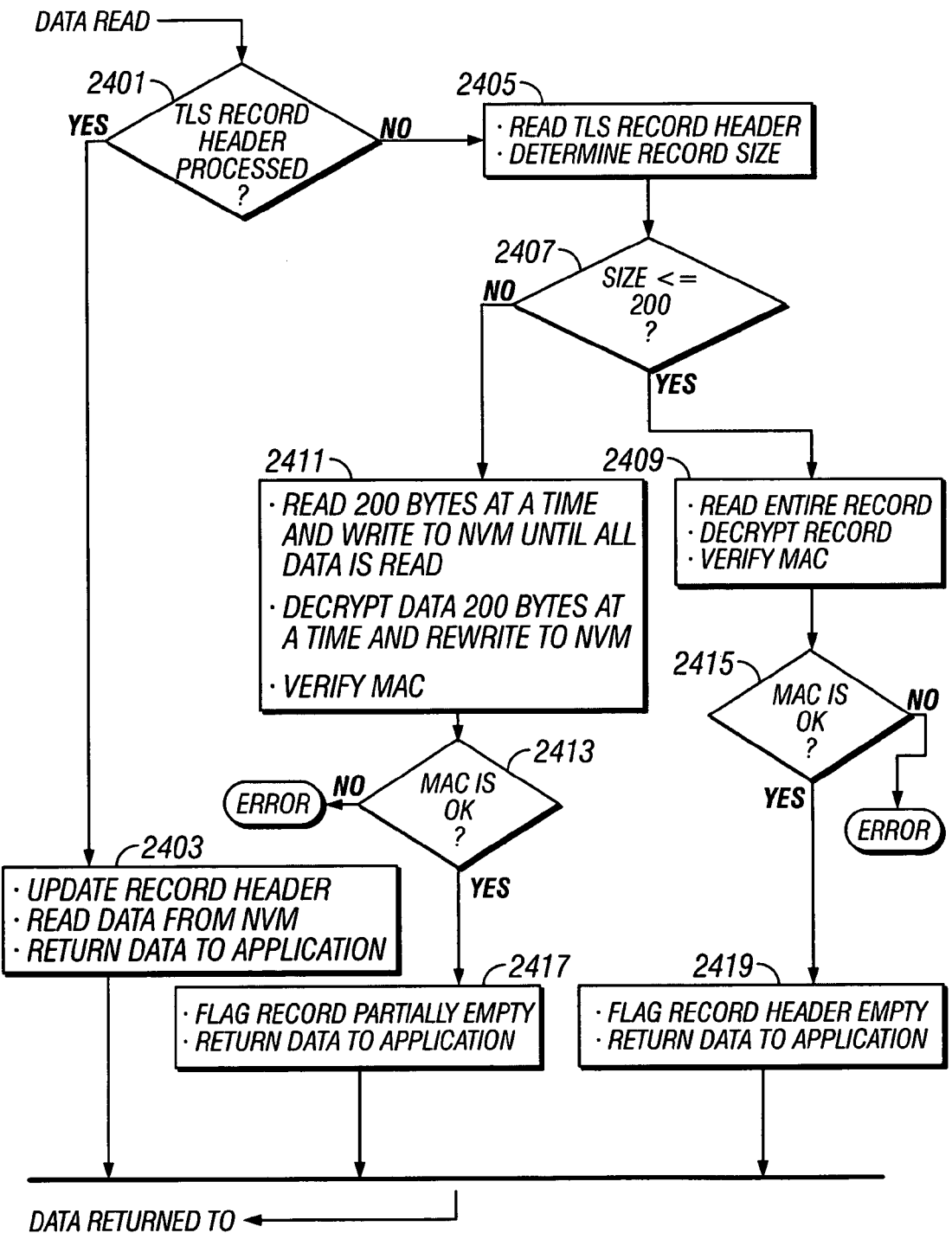
FIG. 24 is an illustration of a second approach to reading large TLS records while using a small TLS buffer, which is called the error-critical approach.

FIG. 24 is an illustration of the second approach to reading large TLS records while using a small TLS buffer, which is called the error-critical approach. In this approach an application 1101 can request that no application level data is returned to it if there is a MAC related error in transmission of data. To provide this functionality, the TLS I/O Module 2013 still uses a 200-byte read buffer from TLS context. However, the TLS I/O Module 2013 successively reads the entire TLS record in the 200-byte buffer and then writes or appends it to a buffer in NVM 2005.

The process controlling the TLS I/O Module 2013 through the second approach starts by checking whether the TLS Record Header has been processed, step 2401. If the record header has been processed, the TLS I/O Module 2013 updates the record header, reads data from the NVM 2005, and return the read data to the application 1101, step 2403. If the record header has not been processed by a previous iteration through the TLS buffer 2201, step 2401, the TLS module 2001 reads the header and determines the record size, step 2403. If the record size is less than or equal to the size of the TLS buffer 2201, e.g., 200 bytes, step 2407, the TLS module 2001 reads the entire record, decrypts it and verifies the MAC, step 2409. If the record size is greater that the size of the TLS buffer 2201, step 2407, then the TLS I/O Module 2013 reads the number of bytes that will fit into the TLS buffer, e.g., 200 bytes, decrypts that amount of data, writes that data to the NVM, and verifies MAC, step 2411. The TLS I/O Module 2013 uses the NVM buffer to decrypt data and then verify MAC. On subsequent read calls, the pending data in NVM is returned directly without any need for decryption or MAC verification. For the path where the record size is too large to fit in the TLS buffer 2201, the record is flagged as partially read, step 2417. If the record was small enough to fit in the TLS buffer 2201, the TLS record header is flagged as empty, step 2419. If the MAC succeeds, steps 2413 and 2415, for all cases, i.e., whether a part of the record or the entire record has been read, the TLS I/O Module 2013 returns the data to the application 1101. At the conclusion of processing the entire buffer, the TLS I/O Module 2013 has returned the requested amount of data to the calling application 1101. For a read request, the TLS I/O Module 2013 repeats the process shown in FIG. 24 until all data in NVM buffer is returned. The second approach provides a much safer application interface but requires the overhead of writing to NVM.

13. Secure Web Server using TLS

One example of an application 1101 may be a secure web server. The implementation of TLS 1.0 library provides a simple application level interface, which is used by an embedded web server application to communicate with standard web browsers over HTTPS. The TLS 1.0 application level interface resembles the BSD style socket interface. The only differences are the pointer for TLS context and buffer reuse optimization flags. When setting the flag for buffer reuse, the secure web server uses the same buffer for application data I/O as used by TLS layer. This cuts down on the RAM requirements for web server.

13.1. TLS Interface

The secure web server application uses the following public functions to interact with the TLS 1.0 server library. All other details of TLS implementation are hidden behind these interfaces:

```
tlsResetCtx( ... )
tlsAccept( ... )
tlsSend( ... )
tlsRecv( ... )
```

13.1.1. tlsResetCtx( )

This function does the work of resetting a specified TLS context. The context is reset in any one of three possible ways depending upon the value of flag argument. The complete signature of this function is:

```
s_int8 tlsResetCtx(tlsContext_t *tlsCtx, u_int8 flag)
;
``` where, tlsCtx is a pointer to the TLS context data structure that needs to be reset. The f lag argument dictates how the reset should work. It can have the following values:

TLS_RESET_INIT. When flag is set to this value, the TLS context is initialized for first time use. The process consists of resetting MD5 and SHA1 contexts, clearing record header information, clearing the input/output buffer, and initializing other data fields that maintain the state of TLS context during handshake phase and actual application data transfer phase.

TLS_RESET_RSA. When flag is set to this value, the TLS context information is saved to NVM so that the RAM buffer occupied by TLS context can be reassigned for other tasks—in this case for RSA computation.

TLS_RESET_TLS. When flag is set to this value, the TLS context information is retrieved from NVM and restored to the TLS context in RAM.

The function returns either TLS_SUCCESS or TLS_ERROR to indicate success or error respectively.

13.1.2. TlsAccept( )

This function does the critical task of performing TLS handshake with client. It negotiates a cipher suite and establishes various session keys for actual data exchange. Both full and partial handshakes are handled in this function. The decision on whether to do full handshake, or perform a computationally less expensive partial handshake is taken dynamically during the initial stage of handshake message exchange with client browser. The complete signature of this function is:

```
s_int8 tlsAccept(tlsContext_t *tlsCtx) ;
``` where, tlsCtx is a pointer to the TLS context data structure. The function returns either TLS_SUCCESS or TLS_ERROR to indicate success or error respectively.

13.1.3. tlsSend( )

This function is the equivalent of the BSD socket API send( ). It sends application data by using the currently established TLS cipher suite to encrypt the data. Users are expected to have called tls Accept( ) to establish a valid TLS session first The complete signature of this function is:

```
s_int16 tlsSend(tlsContext_t *tlsCtx, unsigned char
    *pData,
    s_int16 size, u_int8 flag) ;
``` where, tlsCtx is a pointer to the TLS context data structure, pData is the starting address of data to be sent, size is the length in bytes of data to be sent, and flag is an optimization flag to allow buffer sharing on resource constrained devices.

The flag argument can be set to the following two options:
TLS_COPY_OFF
TLS_COPY_ON To save RAM buffers, this implementation uses input/output buffer from TLS context data structure to prepare the encrypted TLS record for transmission. When the flag option is set to TLS_COPY_ON the raw data pointed to by pData is copied to this TLS context i/o buffer at the appropriate location. It is the caller's responsibility to allocate space for raw data. However, since we are on a resource constrained device, users of this function, like our secure web server, may want to use the same TLS context i/o buffer to gather the raw data in the first place. If this is the case the following rules need to be followed:

Set flag argument to TLS_COPY_OFF.

The starting address of raw data should be the $14^{th}$ byte of the TLS context I/O buffer. The first 13 bytes are reserved for use by TLS library as it prepares the raw data for encryption.

The trailing 28 bytes of the TLS context I/O buffer should not be used by application raw data. These bytes are reserved for padding data and for appending HMAC digest while formatting the TLS record.

Due to these requirements the size argument should be at least 41 bytes less than the size of TLS context I/O buffer array. If size argument is greater than this value, and TLS_COPY_OFF flag is used, the complete data will not be sent.

The return value of this function indicates the size of raw data sent to client. This is not the size of actual data written to underlying socket. The actual data includes TLS record header and encryption and MAC overhead. In case of an error the return value is −1.

13.1.4. tlsRecv( )

This function is the equivalent of the BSD socket API recv( ). It reads application data by using the currently established TLS cipher suite to decrypt the data. Users are expected to have called tlsAccept( ) to establish a valid TLS session first. The complete signature of this function is:

```
s_int16 tlsRecv(tlsContext_t *tlsCtx, unsigned char
    **pData, s_int16 size, u_int8 flag) ;
``` where, tlsCtx is a pointer to the TLS context data structure, pData is the pointer that receives the data, s i z e is the length in bytes of data to be read, and flag is an optimization flag for resource constrained devices. The flag argument can be set to the following two options:

- TLS_RECV_FAST. When this flag is used, and size of TLS record is larger than that of TLS context I/O buffer, data is returned to caller without verifying the integrity of MAC. The MAC is verified downstream when all data in TLS record is read. The MAC verification status is, therefore, deferred to make data access fast for calling application.
- TLS_RECV_SAFE. When this flag is used, we read the complete TLS record into a dedicated buffer in NVM. Message integrity is checked by verifying the MAC. The decrypted data is then returned to calling application. This approach is safe but slow since it involves writing to NVM.

Upon return from this function pData points to the start of decrypted data inside TLS context I/O buffer. It is the caller's responsibility to copy this data to a separate buffer if required. The data is overwritten at the next tlsRecv ( ) call. The function returns the number of plain text bytes that were read and are accessible through pData pointer. In case of an error, the return value is −1.

13.2. Buffer Sharing

A critical element of our secure web server design is to optimize RAM usage by sharing buffers with TLS context. The pseudo C code below describes a usage scenario where TLS public interfaces are used to connect to a client over HTTPS connection. Both tlsRecv ( ) and tlsSend ( ) calls use flags to enable buffer sharing between web server and TLS layer.

```
        /* Create and initialize TLS context data structure */
        tlsContext_t   *tlsCtx ;
        tlsCtx = (tlsContext_t *) malloc(sizeof(tlsContext_t),
MM_RAM) ;
        tlsResetCtx(tlsCtx, TLS_RESET_INIT) ;
        while (1)
        {
        /* Wait for a BSD socket connection from client */
                bsdSocket = accept(listenerSocket, ...) ;
        /* Pass BSD socket to TLS context */
                tlsCtx->socket = bsdSocket ;
        /* Perform TLS handshake with client */
                tlsAccept(tlsCtx) ;
                /* Read client request, use one or more tlsRecv calls
        */
                while (more data in request)
        {
        len = tlsRecv(tlsCtx, pData, 100, TLS_RECV_FAST) ;
                }
        /* Send response to client, one or more tlsSend calls */
                while (more data to send)
        {
            Copy N bytes of data to &tlsCtx->buffer[13]
            tlsSend(tlsCtx, &tlsCtx->buffer[13], N, TLS_COPY_OFF)
        ;
        }
        /* Close BSD socket */
            }
```

The TLS context data structure is allocated dynamically from a heap assigned to TLS layer. The MM_RAM option in malloc( ) call indicates that the allocation should be done in RAM instead of NVM 13.2.1. Reading Request Once TLS layer has established session keys with the client browser through the process of negotiating a full or partial handshake, we can exchange application data with the browser. The first step in data exchange is to read HTTPS request sent by the browser. This is done by making successive calls to tlsRecv ( ) with the flag argument set to TLS_RECV_FAST. By doing so we avoid the overhead of writing the complete TLS record to NVM first. Since each call to tlsRecv ( ) returns a section of the request data using the same TLS context I/O buffer, we parse that portion of request before making another call to tlsRecv ( ).

Although this approach delays the error notification for MAC related errors, it does not affect the security of web server. This is because we do not send any data to client browser until we have read the complete request message. By that time we have read the complete TLS record and any MAC error, if present, has been flagged to us by TLS layer. To check the end of a request message we look at the last four bytes after each tlsRecv ( ) call. A sequence of the following hexadecimal data as last four bytes indicates the end of HTRTPS request; 0x0D, 0x0A, 0x0D, 0x0A.

13.2.2. Sending Response

Once the complete request has been read, we prepare our response to the browser and call tlsSend ( ) function. To save RAM buffer the response is prepared using TLS context I/O buffer, and flag argument in tlsSend ( ) function is set to TLS_COPY_OFF. This not only cuts down on RAM usage, but also is faster since there is no subsequent need to copy our raw data into TLS context I/O buffer. The raw data is already placed in TLS context I/O buffer starting at the $14^{th}$ byte, i.e. &tlsCtx->buffer[13].

13.3. Static and Dynamic Content

The secure web server built on TLS layer demonstrates serving two types of content—static and dynamic. Static content are simple HTML files or other graphics files that are already present on the smart card file system. On the other hand, dynamic content is generated "on-the-fly" based on some request by a client. To generate it the web server launches the corresponding application and passes any user supplied arguments to it. The output of this application is sent to the client browser using the encryption mechanism provided by TLS layer.

The web server distinguishes between requests for dynamic content from those requesting a static file, by parsing the URL string. If the URL string has a reference to an application in the cgi-bin directory, it is treated as a request for dynamic content. An example of dynamic content is a Linux like shell that is invoked as a CGI application by web server. The argument to this shell application is the shell command itself, along with its own set of arguments. Once the shell command is run, the result is formatted and sent to client browser in a secure manner using TLS.

13.4. Browser Differences

There are some subtleties in how various client browsers connect to a web server using HTTPS. Two of these subtleties between IE and Netscape need to be considered when writing a secure web server using TLS layer.

The first difference is in the format of ClientHello message sent by a client browser. When TLS 1.0 is selected as the highest protocol supported, IE sends the first ClientHello message in TLS record format. The major and minor versions are set to 3 and 1 respectively. However, with the same settings on Netscape browser version 7.0 (Netscape does not support TLS 1.0 protocol in browser older than version 7.0.), the first Client Hello message is sent in SSL 2.0 record format. The protocol version proposed in the message is still TLS (major version field set to 3, and minor to 1), but the message itself is in the record format of SSL 2.0 protocol. TLS 1.0 and SSL 2.0 have drastically different record formats. As such, in order to communicate with Netscape browsers, a TLS server has to be able to read and parse the Client Hello message in SSL 2.0 format. Once we respond to Netscape browser with our Server Hello message and set the protocol version to 3.1, all subsequent messages are in TLS 1.0 record format.

The second difference occurs during server authentication when performing a full TLS handshake. In case the server certificate has a problem, IE and Netscape behave quite differently. The server certificate can have a problem for several reasons, particularly during development stages when certificates are generated locally for testing. The problem could be because the certificate has expired, or the holder's domain name does not match the domain name where web server is running, or the Certificate Authority that is signing the certificate is not trusted by the browser. In any case, once a problem is found with the certificate the response from IE and Netscape is quite different. TLS 1.0 specification is silent on this issue so we have to handle both cases.

In case of Netscape, the response is immediate. When the browser finds a problem with the certificate it has received in TLS Certificate message during handshake, it pops up a warning dialog box for the end user. The dialog box has details about the certificate and it asks the user what to do. If the user chooses not to proceed any further, the TLS handshake is abandoned and underlying BSD socket connection is closed. However, if the user chooses to ignore this warning and accept the server certificate, Netscape continues with the rest of handshake as if nothing happened. After handshake completes it exchanges application data with web server.

In case of IE, the behavior is rather peculiar. If IE receives a certificate in the TLS Certificate message, that has a problem, it takes no immediate action. Instead it allows the handshake to proceed normally. Once the handshake completes successfully, it pops us a warning dialog box to the end user. As with Netscape, the user is asked what to do with the certificate. If the user chooses not to continue TLS handshake is abandoned and the socket connection is closed. If on the other hand user chooses to continue, IE still closes the existing socket connection, opens a new socket connection and then sends a fresh ClientHello message. The new ClientHello message includes the session ID from previous full handshake. This is a request to do a partial handshake. Once this partial handshake completes IE starts exchanging application data with web server.

Although specific embodiments (e.g., an infrastructureless network smart card implementing communications and security modules based on TCP/IP, PPP, TLS, AHDLC, APDU) of the invention has been described and illustrated, the invention is not to be limited to the specific forms or arrangements of parts so described and illustrated. For example, the invention is applicable to other resource-constrained devices and is applicable to other communications protocols. The invention is limited only by the claims.

What is claimed is:

1. A method of secure communication between a smart card and remote network nodes over a network wherein the smart card acts as a standalone network node and the remote network nodes communicate with the smart card using un-modified network clients and servers and wherein the smart card has a central processing unit, a random access memory, a non-volatile memory, a read-only memory, and an input and output component, comprising:
    using a physical link selected from one of several physical link methods;
    assigning a unique network address to the smart card thereby enabling the smart card to act as a standalone network node;
    executing on the smart card a communications module implementing networking protocols and one or more link layer communication protocols, operable to communicate with a host computer, operable to communicate with remote network nodes using the networking protocols and operable to implement network security protocols thereby setting a security boundary inside the smart card;
    implementing an execution model, wherein the communication module is driven by input events and by the applications and wherein the smart card optimized memory usage by sharing data buffers between one or more communications protocol layers or security protocol layers;
    executing on the host computer one or more communication and networking protocols operable to communicate with the smart card and operable to communicate with the remote network nodes; and
    executing one or more secure network applications on the smart card wherein the network applications call upon the communication module of the smart card to communicate with the host computer or the remote network node using the networking protocols and network security protocols and wherein the secure network applications are securely accessible by the remote network nodes using un-modified network clients and servers.

2. The method of claim 1 wherein the physical link is selected from the set including full-duplex serial connection and half-duplex serial connection.

3. The method of claim 2 wherein the physical link is a full-duplex serial connection using the serial peripheral interface protocol.

4. The method of claim 1 further comprising connecting an interface device between the smart card and the host computer using a physical link that is a serial connection having half-duplex between the smart card and the interface device and full-duplex between the interface device and the host computer.

5. The method of claim 4 further comprising operating the interface device to perform a bridging function between the half-duplex connection and the full-duplex connection.

6. The method of claim 5 wherein the step of performing a bridging function further comprises providing at least one of function selected from:
    enabling a smart card operating in a command/response mode to communicate with network nodes as a peer;
    enabling a smart card operating in half-duplex communication mode to handle full-duplex communication traffic;
    encapsulating upper layer protocol frames;
    enabling transportation of upper layer protocol frames exceeding a frame size limit of the lower link layer; and
    supporting multiple logical connections of upper layer protocols.

7. The method of claim 4 of operating a software module on the interface device according to a finite state machine permitting the interface device to forward messages between the smart card and the network wherein the interface device is in one of the at least one states permitting the smart card to initiate and send messages.

8. The method of claim 7 wherein the at least one state is selected from a set of states corresponding to the interface device transmitting a Send, a Put, and a Poll command, respectively.

9. The method of claim 4 of operating a software module on the host computer according to a finite state machine having at least one state permitting the smart card to transmit messages to the network wherein the software module is in one of the at least one states permitting the smart card to initiate and send messages.

10. The method of claim 9 wherein the at least one state permitting the smart card to transmit messages to the network is selected from a set of states corresponding to the interface device transmitting a Send, a Put, and a Poll command, respectively.

11. The method of claim 9 comprising the step of operating the smart card according to a finite state machine having at least one state in which the smart card waits for a message from the host computer indicating that the smart card may transmit a message.

12. The method of claim 4 further comprising:
operating the smart card according to a finite state machine whereby the smart card uses the response status at the end of the response to the command sent by the host computer or an intermediate device to indicate that the smart card wants to transmit information to the host computer or to the network.

13. The method of claim 12 where in the step of operating the smart card comprises operating the smart card according to a finite state machine having at least one state in which the smart card waits for a message indicating to the smart card that the smart card may transmit information to the host.

14. The method of claim 13 further comprising operating the smart card to transition among the states of the finite state machine.

15. The method of claim 12 further comprising:
operating the host computer or an intermediate device connected between the host computer and the smart card according to a finite state machine to transmit a polling message to the smart card checking if the smart card may want to transmit information to the host computer.

16. The method of claim 15 wherein the host computer or intermediate device includes a Remote Access Server (RAS) and wherein the step of operating the host computer or intermediate device comprises operating the host computer or intermediate device according to a finite state machine having a Polling state in which the host computer or intermediate device polls the smart card, a Get-from-card state in which the host computer or intermediate device obtains packets of data from the smart card, a Putting-to-card state in which the host computer or intermediate device transmits data to the smart card, and a Checking Remote Access Server(RAS) state in which the host computer or intermediate device checks whether Remote Access Server (RAS) has any data to transmit to the smart card.

17. The method of claim 16 further comprising operating the host computer or the intermediate device to transition among the states of the finite state machine.

18. A system providing secure communication between a smart card and remote network nodes over a network wherein the remote network nodes communicate with the smart card using un-modified network clients and sewers and wherein the smart card has a central processing unit, a random access memory, a non-volatile memory, a read-only memory, and an input and output component, the system comprising:
a physical link connecting the smart card and a host computer, the physical link selected from one of several physical link methods;
logic to assign a unique network address to the smart card thereby enabling the smart card to act as a standalone network node;
the smart card comprising a communications module implementing networking protocols and one or more link layer communication protocols, operable to communicate with the host computer, operable to communicate with remote network nodes using the networking protocols and operable to implement network security protocols thereby setting a security boundary inside the smart card, wherein the communication module is driven by input events and by the applications and wherein the smart card optimizes memory usage by sharing data buffers between one or more communications protocol layers or security protocol layers;
the host computer comprising logic implementing one or more communication networking protocols operable to communicate with the smart card and operable to communicate with the remote network nodes; and
the smart card further comprising one or more secure network applications wherein the network applications call upon the communication module of the smart card to communicate with the host computer or the remote network node using the networking protocols and network security protocols and wherein the secure network applications are securely accessible by the host computer or the remote network nodes using un-modified network clients or servers.

19. The system of claim 18 wherein the physical link is selected from the set including full-duplex serial connection and half-duplex serial connection.

20. The system of claim 19 wherein the physical link is a full-duplex serial connection using the serial peripheral interface protocol.

21. The system of claim 18 further comprising an interface device between the smart card and the host computer, the interface device using a physical link that is a serial connection having half-duplex between the smart card and the interface device and full-duplex between the interface device and the host computer.

22. The system of claim 21 further wherein the interface device comprises logic to perform a bridging function between the half-duplex connection and the full-duplex connection.

23. The system of claim 22 wherein the logic to perform a bridging function further comprises logic to provide at least one of function selected from:
enabling a smart card operating in a command/response mode to communicate with network nodes as a peer;
enabling a smart card operating in half-duplex communication mode to handle full-duplex communication traffic;
encapsulating upper layer protocol frames;
enabling transportation of upper layer protocol frames exceeding a frame size limit of the lower link layer; and
supporting multiple logical connections of upper layer protocols.

24. The system of claim 21 wherein the interface device further comprises logic to operate the interface device according to a finite state machine permitting the interface device to forward messages between the smart card and the network wherein the interface device is in one of the at least one states permitting the smart card to initiate and send messages.

25. The system of claim 24 wherein the at least one state permitting the smart card to transmit messages to the network is selected from a set of states corresponding to the interface device transmitting a Send, a Put, and a Poll command, respectively.

26. The system of claim 21 of wherein the host computer further comprises logic to operate the host computer according to a finite state machine having at least one state permitting the smart card to transmit messages to the network wherein the software module is in one of the at least one states permitting the smart card to initiate and send messages.

27. The system of claim 26 wherein the at least one state is selected from a set of states corresponding to the interface device transmitting a Send, a Put, and a Poll command, respectively.

28. The system of claim 26 wherein the smart card comprises logic to operate the smart card according to a finite state machine having at least one state in which the smart card waits for a message from the host computer indicating that the smart card may transmit a message.

29. The system of claim 21 wherein the smart card further comprises logic to operate the smart card according to a finite state machine whereby smart card uses the response status at the end of the response to the command sent by the host computer or an intermediate device to indicate that the smart card wants to transmit information to the host computer or to the network.

30. The system of claim 29 wherein the logic to operate the smart card according to a finite state machine further comprises logic to operate the smart card according to a finite state machine having at least one state in which the smart card waits for a message indicating to the smart card that the smart card may transmit information to the host.

31. The system of claim 30 further the logic to operate the smart card according to a finite state machine further comprises logic to operate the smart card to transition among the states of the finite state machine.

32. The system of claim 29 further comprising:
logic in the host computer or an intermediate device connected between the host computer and the smart card to operate according to a finite state machine to transmit a polling message to the smart card checking if the smart card may want to transmit information to the host computer.

33. The system of claim 32 wherein the host computer or intermediate device includes a Remote Access Server (RAS) and wherein the logic to operate the host computer or intermediate device comprises logic to operate the host computer or intermediate device according to a finite state machine having a Polling state in which the host computer or intermediate device polls the smart card, a Get-from-card state in which the host computer or intermediate device obtains packets of data from the smart card, a Putting-to-card state in which the host computer or intermediate device transmits data to the smart card, and a Checking Remote Access Server RAS state in which the host computer or intermediate device checks whether Remote Access Server RAS has any data to transmit to the smart card.

34. The system of claim 33 further comprising logic to operate the host computer or the intermediate device to transition among the states of the finite state machine.

35. A method of secure communication between a MultiMediaCard (MMC) and remote network nodes over a network wherein the MultiMediaCard (MMC) acts as a standalone network node and the remote network nodes communicate with the MultiMediaCard (MMC) using un-modified network clients and servers and wherein the MultiMediaCard (MMC) has a central processing unit, a random access memory, a non-volatile memory, a read-only memory, and an input and output component, comprising:
using a physical link selected from one of several physical link methods;
assigning a unique network address to the MultiMediaCard (MMC) thereby enabling the MultiMediaCard (MMC) to act as a standalone network node;
executing on the MultiMediaCard (MMC) a communications module implementing networking protocols and one or more link layer communication protocols, operable to communicate with a host computer, operable to communicate with remote network nodes using the networking protocols and operable to implement network security protocols thereby setting a security boundary inside MultiMediaCard (MMC);
implementing an execution model, wherein the communication module is driven by input events and by the applications and wherein the MultiMediaCard (MMC) optimized memory usage by sharing data buffers between one or more communications protocol layers or security protocol layers;
executing on the host computer one or more communication and networking protocols operable to communicate with the MultiMediaCard (MMC) and operable to communicate with the remote network nodes; and
executing one or more secure network applications on the MultiMediaCard (MMC) wherein the network applications call upon the communication module of the MultiMediaCard (MMC) to communicate with the host computer or the remote network node using the networking protocols and network security protocols and wherein the secure network applications are securely accessible by the remote network nodes using un-modified network clients and servers.

36. A system providing secure communication between a MultiMediaCard (MMC) and remote network nodes over a network wherein the remote network nodes communicate with the MultiMediaCard (MMC) using un-modified network clients and servers and wherein the MultiMediaCard (MMC) has a central processing unit, a random access memory, a non-volatile memory, a read-only memory, and an input and output component, the system comprising:
a physical link connecting the MultiMediaCard (MMC) and a host computer, the physical link selected from one of several physical link methods;
logic to assign a unique network address to the MultiMediaCard (MMC) thereby enabling the MultiMediaCard (MMC) to act as a standalone network node;
the MultiMediaCard (MMC) comprising a communications module implementing networking protocols and one or more link layer communication protocols, operable to communicate with the host computer, operable to communicate with remote network nodes using the networking protocols and operable to implement network security protocols thereby setting a security boundary inside the MultiMediaCard (MMC), wherein the communication module is driven by input events and by the applications and wherein the MultiMediaCard (MMC) optimizes memory usage by sharing data buffers between one or more communications protocol layers or security protocol layers;
the host computer comprising logic implementing one or more communication networking protocols operable to communicate with the MultiMediaCard (MMC) and operable to communicate with the remote network nodes; and
the MultiMediaCard (MMC) further comprising one or more secure network applications wherein the network applications call upon the communication module of the MultiMediaCard (MMC) to communicate with the host computer or the remote network node using the networking protocols and network security protocols and wherein the secure network applications are securely accessible by the host computer or the remote network nodes using un-modified network clients or servers.

37. The method of claim 35 wherein the physical link is selected from the set including full-duplex serial connection and half-duplex serial connection.

38. The method of claim 37 wherein the physical link is a full-duplex serial connection using the serial peripheral interface protocol.

39. The method of claim 35 further comprising connecting an interface device between the smart card and the host computer using a physical link that is a serial connection having half-duplex between the smart card and the interface device and full-duplex between the interface device and the host computer.

40. The method of claim 39 further comprising operating the interface device to perform a bridging function between the half-duplex connection and the full-duplex connection.

41. The method of claim 40 wherein the step of performing a bridging function further comprises providing at least one of function selected from:
enabling a smart card operating in a command/response mode to communicate with network nodes as a peer;
enabling a smart card operating in half-duplex communication mode to handle full-duplex communication traffic;
encapsulating upper layer protocol frames;
enabling transportation of upper layer protocol frames exceeding a frame size limit of the lower link layer; and
supporting multiple logical connections of upper layer protocols.

42. The method of claim 39 of operating a software module on the interface device according to a finite state machine permitting the interface device to forward messages between the smart card and the network wherein the interface device is in one of the at least one states permitting the smart card to initiate and send messages.

43. The method of claim 42 wherein the at least one state is selected from a set of states corresponding to the interface device transmitting a Send, a Put, and a Poll command, respectively.

44. The method of claim 39 of operating a software module on the host computer according to a finite state machine having at least one state permitting the smart card to transmit messages to the network wherein the software module is in one of the at least one states permitting the smart card to initiate and send messages.

45. The method of claim 44 wherein the at least one state permitting the smart card to transmit messages to the network is selected from a set of states corresponding to the interface device transmitting a Send, a Put, and a Poll command, respectively.

46. The method of claim 44 comprising the step of operating the smart card according to a finite state machine having at least one state in which the smart card waits for a message from the host computer indicating that the smart card may transmit a message.

47. The method of claim 39 further comprising:
operating the smart card according to a finite state machine whereby the smart card uses the response status at the end of the response to the command sent by the host computer or an intermediate device to indicate that the smart card wants to transmit information to the host computer or to the network.

48. The method of claim 47 wherein the step of operating the smart card comprises operating the smart card according to a finite state machine having at least one state in which the smart card waits for a message indicating to the smart card that the smart card may transmit information to the host.

49. The method of claim 48 further comprising operating the smart card to transition among the states of the finite state machine.

50. The method of claim 47 further comprising:
operating the host computer or an intermediate device connected between the host computer and the smart card according to a finite state machine to transmit a polling message to the smart card checking if the smart card may want to transmit information to the host computer.

51. The method of claim 50 wherein the host computer or intermediate device includes a Remote Access Server (RAS) and wherein the step of operating the host computer or intermediate device comprises operating the host computer or intermediate device according to a finite state machine having a Polling state in which the host computer or intermediate device polls the smart card, a Get-from-card state in which the host computer or intermediate device obtains packets of data from the smart card, a Putting-to-card state in which the host computer or intermediate device transmits data to the smart card, and a Checking Remote Access Server (RAS) state in which the host computer or intermediate device checks whether Remote Access Server (RAS) has any data to transmit to the smart card.

52. The method of claim 51 further comprising operating the host computer or the intermediate device to transition among the states of the finite state machine.

53. The system of claim 36 wherein the physical link is selected from the set including full-duplex serial connection and half-duplex serial connection.

54. The system of claim 53 wherein the physical link is a full-duplex serial connection using the serial peripheral interface protocol.

55. The system of claim 36 further comprising connecting an interface device between the smart card and the host computer using a physical link that is a serial connection having half-duplex between the smart card and the interface device and full-duplex between the interface device and the host computer.

56. The system of claim 55 further comprising operating the interface device to perform a bridging function between the half-duplex connection and the full-duplex connection.

57. The system of claim 56 wherein the step of performing a bridging function further comprises providing at least one of function selected from:
enabling a smart card operating in a command/response mode to communicate with network nodes as a peer;
enabling a smart card operating in half-duplex communication mode to handle full-duplex communication traffic;
encapsulating upper layer protocol frames;
enabling transportation of upper layer protocol frames exceeding a frame size limit of the lower link layer; and
supporting multiple logical connections of upper layer protocols.

58. The system of claim 55 of operating a software module on the interface device according to a finite state machine permitting the interface device to forward messages between the smart card and the network wherein the interface device is in one of the at least one states permitting the smart card to initiate and send messages.

59. The system of claim 58 wherein the at least one state is selected from a set of states corresponding to the interface device transmitting a Send, a Put, and a Poll command, respectively.

60. The system of claim 55 of operating a software module on the host computer according to a finite state machine having at least one state permitting the smart card to transmit messages to the network wherein the software module is in one of the at least one states permitting the smart card to initiate and send messages.

61. The system of claim 60 wherein the at least one state permitting the smart card to transmit messages to the network is selected from a set of states corresponding to the interface device transmitting a Send, a Put, and a Poll command, respectively.

62. The system of claim 60 comprising the step of operating the smart card according to a finite state machine having at least one state in which the smart card waits for a message from the host computer indicating that the smart card may transmit a message.

63. The system of claim 55 further comprising:
operating the smart card according to a finite state machine whereby the smart card uses the response status at the end of the response to the command sent by the host computer or an intermediate device to indicate that the smart card wants to transmit information to the host computer or to the network.

64. The system of claim 63 wherein the step of operating the smart card comprises operating the smart card according to a finite state machine having at least one state in which the smart card waits for a message indicating to the smart card that the smart card may transmit information to the host.

65. The system of claim 64 further comprising operating the smart card to transition among the states of the finite state machine.

66. The system of claim 63 further comprising:
operating the host computer or an intermediate device connected between the host computer and the smart card according to a finite state machine to transmit a polling message to the smart card checking if the smart card may want to transmit information to the host computer.

67. The system of claim 66 wherein the host computer or intermediate device includes a Remote Access Server (RAS) and wherein the step of operating the host computer or intermediate device comprises operating the host computer or intermediate device according to a finite state machine having a Polling state in which the host computer or intermediate device polls the smart card, a Get-from-card state in which the host computer or intermediate device obtains packets of data from the smart card, a Putting-to-card state in which the host computer or intermediate device transmits data to the smart card, and a Checking Remote Access Server (RAS) state in which the host computer or intermediate device checks whether Remote Access Server (RAS) has any data to transmit to the smart card.

68. The method of claim 67 further comprising operating the host computer or the intermediate device to transition among the states of the finite state machine.

* * * * *